(12) United States Patent
Heinz, II et al.

(10) Patent No.: US 10,315,110 B2
(45) Date of Patent: Jun. 11, 2019

(54) SERVICE FOR GENERATING GRAPHICS OBJECT DATA

(71) Applicant: Amazon Technologies, Inc., Seattle, WA (US)

(72) Inventors: Gerard Joseph Heinz, II, Seattle, WA (US); Venelin Nikolaev Efremov, Trabuco Canyon, CA (US); Jonathan Paul Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/430,704

(22) Filed: Feb. 13, 2017

(65) Prior Publication Data

US 2017/0151496 A1   Jun. 1, 2017

Related U.S. Application Data

(63) Continuation of application No. 14/077,127, filed on Nov. 11, 2013, now Pat. No. 9,604,139.

(51) Int. Cl.
| | |
|---|---|
| *G06T 1/00* | (2006.01) |
| *A63F 13/355* | (2014.01) |
| *D06B 1/00* | (2006.01) |
| *G06F 15/00* | (2006.01) |
| *G06F 3/14* | (2006.01) |

(Continued)

(52) U.S. Cl.
CPC .............. *A63F 13/355* (2014.09); *D06B 1/00* (2013.01); *G06F 3/1454* (2013.01); *G06F 15/00* (2013.01); *G06T 5/002* (2013.01); *G06T 11/60* (2013.01); *A63F 2300/538* (2013.01); *G09G 2340/02* (2013.01); *G09G 2340/12* (2013.01); *G09G 2350/00* (2013.01); *G09G 2370/022* (2013.01)

(58) Field of Classification Search
CPC ....... A63F 13/12; A63F 13/352; A63F 13/355
See application file for complete search history.

(56) References Cited

U.S. PATENT DOCUMENTS

| | | |
|---|---|---|
| 4,090,221 A | 5/1978 | Connor |
| 5,390,188 A | 2/1995 | Dawson |
| 5,475,817 A | 12/1995 | Waldo et al. |

(Continued)

FOREIGN PATENT DOCUMENTS

| | | |
|---|---|---|
| CN | 1154169 A | 7/1997 |
| CN | 101025901 A | 8/2007 |

(Continued)

OTHER PUBLICATIONS

U.S. Appl. No. 14/317,441, filed Jun. 27, 2014, Kalman et al.

(Continued)

*Primary Examiner* — Lawrence S Galka
(74) *Attorney, Agent, or Firm* — BakerHostetler

(57) ABSTRACT

When a scene is generated, a content item may identify graphics object service requests associated with the scene. Each scene may have any number of associated graphics object service requests that may be sent to any number of different graphics object services. The graphics object services may be accessible over a network such as the Internet. By requesting object data from graphics object services, a content item may, for example, reduce at least part of the computational burden on a graphics processing unit of a client device.

20 Claims, 12 Drawing Sheets

(51) Int. Cl.
*G06T 5/00* (2006.01)
*G06T 11/60* (2006.01)

(56) References Cited

U.S. PATENT DOCUMENTS

| | | | |
|---|---|---|---|
| 5,774,668 A | 6/1998 | Choquier et al. | |
| 5,956,489 A | 9/1999 | San Andreas et al. | |
| 6,343,313 B1 | 1/2002 | Salesky et al. | |
| 6,351,467 B1 | 2/2002 | Dillon | |
| 6,525,731 B1 | 2/2003 | Suits et al. | |
| 6,556,206 B1 | 4/2003 | Benson et al. | |
| 6,694,346 B1 | 2/2004 | Aman et al. | |
| 6,941,078 B1 | 9/2005 | Onaka | |
| 7,068,729 B2 | 6/2006 | Shokrollahi et al. | |
| 7,177,448 B1 | 2/2007 | Sah | |
| 7,249,291 B2 | 7/2007 | Rasmussen et al. | |
| 7,447,235 B2 | 11/2008 | Luby et al. | |
| 7,522,167 B1 | 4/2009 | Diard et al. | |
| 7,548,242 B1 | 6/2009 | Hughes et al. | |
| 7,616,206 B1 | 11/2009 | Danilak | |
| 7,616,207 B1 | 11/2009 | Diard et al. | |
| 7,623,131 B1 | 11/2009 | Johnson | |
| 7,660,245 B1 | 2/2010 | Luby | |
| 7,711,068 B2 | 5/2010 | Shokrollahi et al. | |
| 7,720,174 B2 | 5/2010 | Shokrollahi et al. | |
| 7,721,184 B2 | 5/2010 | Luby et al. | |
| 7,956,772 B2 | 6/2011 | Shokrollahi et al. | |
| 7,969,444 B1 | 6/2011 | Biermann et al. | |
| 7,984,179 B1 | 7/2011 | Huang | |
| 8,065,676 B1 | 11/2011 | Sahai et al. | |
| 8,185,809 B2 | 5/2012 | Luby et al. | |
| 8,190,760 B2 | 5/2012 | Hurst et al. | |
| 8,279,755 B2 | 10/2012 | Luby | |
| 8,458,567 B2 | 6/2013 | Luby et al. | |
| 8,473,557 B2 | 6/2013 | Ramakrishnan et al. | |
| 8,478,816 B2 | 7/2013 | Parks et al. | |
| 8,484,284 B2 | 7/2013 | Elliott et al. | |
| 8,527,646 B2 | 9/2013 | Khatib et al. | |
| 8,572,251 B2 * | 10/2013 | Srinivas | G06F 9/5044 709/226 |
| 8,574,074 B2 | 11/2013 | van Datta et al. | |
| 8,582,299 B1 | 11/2013 | Phillips et al. | |
| 8,671,163 B2 | 3/2014 | Luby et al. | |
| 8,795,076 B2 | 8/2014 | van Datta et al. | |
| 8,838,722 B2 | 9/2014 | Ridges et al. | |
| 8,928,659 B2 | 1/2015 | Bar-Zeev et al. | |
| 8,996,864 B2 | 3/2015 | Maigne et al. | |
| 9,170,961 B2 | 10/2015 | Das et al. | |
| 9,192,859 B2 | 11/2015 | Perlman et al. | |
| 9,338,226 B2 | 5/2016 | Korangy et al. | |
| 9,466,074 B2 | 10/2016 | van Data et al. | |
| 9,940,647 B2 | 4/2018 | Perry et al. | |
| 2002/0039371 A1 | 4/2002 | Hedayat et al. | |
| 2002/0114404 A1 | 8/2002 | Aizawa et al. | |
| 2002/0129159 A1 | 9/2002 | Luby et al. | |
| 2002/0147611 A1 | 10/2002 | Greene et al. | |
| 2002/0173984 A1 | 11/2002 | Robertson et al. | |
| 2002/0176367 A1 | 11/2002 | Gross | |
| 2003/0091000 A1 | 5/2003 | Chu et al. | |
| 2003/0105925 A1 | 6/2003 | Yoshimura et al. | |
| 2003/0212742 A1 | 11/2003 | Hochmuth et al. | |
| 2004/0057379 A1 | 3/2004 | Chen et al. | |
| 2004/0073903 A1 | 4/2004 | Melchione et al. | |
| 2004/0093206 A1 | 5/2004 | Hardwick | |
| 2004/0098748 A1 | 5/2004 | Bo et al. | |
| 2004/0101274 A1 | 5/2004 | Foisy et al. | |
| 2004/0153316 A1 | 8/2004 | Hardwick | |
| 2004/0236547 A1 | 11/2004 | Rappaport et al. | |
| 2005/0135305 A1 | 6/2005 | Wentink | |
| 2006/0036756 A1 | 2/2006 | Driemeyer et al. | |
| 2006/0061651 A1 | 3/2006 | Tetterington | |
| 2006/0072831 A1 * | 4/2006 | Pallister | A63F 13/12 382/232 |
| 2006/0088093 A1 | 4/2006 | Lakaniemi et al. | |
| 2006/0092847 A1 | 5/2006 | Mohan | |
| 2006/0168147 A1 | 7/2006 | Inoue et al. | |
| 2006/0285489 A1 | 12/2006 | Francisco et al. | |
| 2007/0009043 A1 | 1/2007 | Craig et al. | |
| 2007/0053692 A1 | 3/2007 | Hoshida et al. | |
| 2007/0094094 A1 | 4/2007 | Yaron et al. | |
| 2007/0140359 A1 | 6/2007 | Ehret et al. | |
| 2007/0156725 A1 | 7/2007 | Ehret et al. | |
| 2007/0183493 A1 | 8/2007 | Kimpe | |
| 2007/0216776 A1 | 9/2007 | Woolfe | |
| 2007/0226364 A1 | 9/2007 | Landspurg | |
| 2007/0240160 A1 | 10/2007 | Paterson-Jones et al. | |
| 2007/0265073 A1 | 11/2007 | Novi et al. | |
| 2008/0008093 A1 | 1/2008 | Wang et al. | |
| 2008/0104608 A1 | 5/2008 | Hyser et al. | |
| 2008/0172140 A1 | 7/2008 | Kim et al. | |
| 2008/0281793 A1 | 11/2008 | Mathur | |
| 2009/0081964 A1 | 3/2009 | Buznach | |
| 2009/0124387 A1 | 5/2009 | Perlman et al. | |
| 2009/0131177 A1 | 5/2009 | Pearce | |
| 2009/0150750 A1 | 6/2009 | Liu et al. | |
| 2009/0195537 A1 * | 8/2009 | Qiu | G06T 1/20 345/419 |
| 2009/0216364 A1 | 8/2009 | Grissom | |
| 2009/0245426 A1 | 10/2009 | Ratnakar et al. | |
| 2009/0249440 A1 | 10/2009 | Platt et al. | |
| 2009/0251488 A1 * | 10/2009 | Clavel | H04M 1/72525 345/619 |
| 2009/0307565 A1 | 12/2009 | Luby et al. | |
| 2010/0017686 A1 | 1/2010 | Luby et al. | |
| 2010/0063992 A1 | 3/2010 | Ma et al. | |
| 2010/0064102 A1 | 3/2010 | Brown et al. | |
| 2010/0088453 A1 | 4/2010 | Solki et al. | |
| 2010/0091669 A1 | 4/2010 | Liu et al. | |
| 2010/0110634 A1 | 5/2010 | Woodbury, II et al. | |
| 2010/0156892 A1 | 6/2010 | Chan et al. | |
| 2010/0166058 A1 | 7/2010 | Perlman et al. | |
| 2010/0166063 A1 | 7/2010 | Perlman et al. | |
| 2010/0166065 A1 | 7/2010 | Perlman et al. | |
| 2010/0166068 A1 | 7/2010 | Perlman et al. | |
| 2010/0214940 A1 | 8/2010 | Macauley | |
| 2010/0218014 A1 | 8/2010 | Bozek et al. | |
| 2010/0289803 A1 * | 11/2010 | Klosowski | H04L 12/6418 345/502 |
| 2010/0312891 A1 | 12/2010 | Pairault et al. | |
| 2011/0002377 A1 | 1/2011 | Raveendran | |
| 2011/0002378 A1 | 1/2011 | Raveendran | |
| 2011/0002379 A1 | 1/2011 | Raveendran | |
| 2011/0002399 A1 | 1/2011 | Raveendran | |
| 2011/0002405 A1 | 1/2011 | Raveendran | |
| 2011/0040396 A1 | 2/2011 | Kraemer et al. | |
| 2011/0040894 A1 | 2/2011 | Shrum et al. | |
| 2011/0047263 A1 | 2/2011 | Martins et al. | |
| 2011/0055372 A1 | 3/2011 | Elyashev et al. | |
| 2011/0055602 A1 | 3/2011 | Kamay et al. | |
| 2011/0067072 A1 | 3/2011 | Parekh et al. | |
| 2011/0125746 A1 | 5/2011 | Leary et al. | |
| 2011/0126110 A1 | 5/2011 | Vilke et al. | |
| 2011/0134111 A1 | 6/2011 | Stone | |
| 2011/0149751 A1 | 6/2011 | Li et al. | |
| 2011/0157193 A1 | 6/2011 | Boucher et al. | |
| 2011/0252181 A1 | 10/2011 | Ouye et al. | |
| 2011/0252356 A1 | 10/2011 | Morris | |
| 2011/0276689 A1 | 11/2011 | Rosen | |
| 2011/0283045 A1 | 11/2011 | Krishnan et al. | |
| 2011/0304634 A1 | 12/2011 | Urbach | |
| 2011/0317568 A1 | 12/2011 | Flinta et al. | |
| 2012/0004040 A1 | 1/2012 | Pereira et al. | |
| 2012/0004041 A1 | 1/2012 | Pereira et al. | |
| 2012/0004042 A1 | 1/2012 | Perry et al. | |
| 2012/0005316 A1 | 1/2012 | Perry et al. | |
| 2012/0069036 A1 * | 3/2012 | Dharmapurikar | G06F 3/14 345/582 |
| 2012/0084774 A1 | 4/2012 | Post et al. | |
| 2012/0089980 A1 | 4/2012 | Sharp et al. | |
| 2012/0093252 A1 | 4/2012 | Strait | |
| 2012/0117145 A1 | 5/2012 | Clift et al. | |
| 2012/0141089 A1 | 6/2012 | Hunt | |
| 2012/0154389 A1 * | 6/2012 | Bohan | G06F 9/5044 345/419 |

(56) References Cited

U.S. PATENT DOCUMENTS

| | | |
|---|---|---|
| 2012/0173715 A1 | 7/2012 | Selitser et al. |
| 2012/0182387 A1 | 7/2012 | Enenkl et al. |
| 2012/0188341 A1 | 7/2012 | Klien et al. |
| 2012/0192031 A1 | 7/2012 | Liu et al. |
| 2012/0206572 A1 | 8/2012 | Russell |
| 2012/0209933 A1 | 8/2012 | Ridges et al. |
| 2012/0213272 A1 | 8/2012 | Liu et al. |
| 2012/0224490 A1 | 9/2012 | Ikada |
| 2012/0227058 A1 | 9/2012 | Hunt |
| 2012/0268553 A1 | 10/2012 | Talukder |
| 2012/0281715 A1 | 11/2012 | Shojania et al. |
| 2012/0281962 A1 | 11/2012 | Hunt et al. |
| 2012/0311448 A1 | 12/2012 | Achour et al. |
| 2012/0331147 A1 | 12/2012 | Dutta et al. |
| 2013/0007499 A1 | 1/2013 | Moy |
| 2013/0016107 A1* | 1/2013 | Dharmapurikar ....... G06F 9/505 345/501 |
| 2013/0024812 A1 | 1/2013 | Reeves et al. |
| 2013/0031161 A1 | 1/2013 | Yang |
| 2013/0036476 A1 | 2/2013 | Roever et al. |
| 2013/0038618 A1 | 2/2013 | Urbach |
| 2013/0067469 A1 | 3/2013 | Das et al. |
| 2013/0069946 A1 | 3/2013 | Venon et al. |
| 2013/0106855 A1 | 5/2013 | Urbach |
| 2013/0151683 A1 | 6/2013 | Jain et al. |
| 2013/0151803 A1 | 6/2013 | Tofano |
| 2013/0210522 A1* | 8/2013 | Dharmapurikar ..... G06T 15/005 463/31 |
| 2013/0212477 A1 | 8/2013 | Averbuch |
| 2013/0227710 A1 | 8/2013 | Barak et al. |
| 2013/0263131 A1 | 10/2013 | Beda, III et al. |
| 2013/0281791 A1 | 10/2013 | Aferzon |
| 2013/0282791 A1 | 10/2013 | Kruglick |
| 2013/0306269 A1 | 11/2013 | Helbig et al. |
| 2013/0307847 A1* | 11/2013 | Dey .......................... G06T 1/00 345/419 |
| 2013/0322517 A1 | 12/2013 | Zurpal et al. |
| 2013/0326024 A1 | 12/2013 | Chen et al. |
| 2013/0344960 A1 | 12/2013 | Perry et al. |
| 2013/0344961 A1* | 12/2013 | Iannetta .................. G09G 5/026 463/36 |
| 2013/0344966 A1* | 12/2013 | Mustafa .................. A63F 13/12 463/42 |
| 2013/0346899 A1 | 12/2013 | Cole et al. |
| 2014/0025710 A1 | 1/2014 | Sarto |
| 2014/0108967 A1 | 4/2014 | Markham et al. |
| 2014/0143301 A1 | 5/2014 | Watson et al. |
| 2014/0171186 A1 | 6/2014 | Arnone et al. |
| 2014/0173060 A1 | 6/2014 | Jubran et al. |
| 2014/0173674 A1 | 6/2014 | Wolman et al. |
| 2014/0176536 A1 | 6/2014 | Kern et al. |
| 2014/0176583 A1 | 6/2014 | Abiezzi et al. |
| 2014/0213191 A1 | 7/2014 | Courtice |
| 2014/0216688 A1 | 8/2014 | Shelnutt et al. |
| 2014/0267283 A1 | 9/2014 | Nystad et al. |
| 2014/0279581 A1* | 9/2014 | Devereaux ........... G06Q 50/184 705/310 |
| 2014/0297798 A1 | 10/2014 | Bakalash et al. |
| 2014/0337835 A1 | 11/2014 | Johnson |
| 2014/0364228 A1 | 12/2014 | Rimon |
| 2014/0379775 A1 | 12/2014 | Korangy et al. |
| 2015/0019965 A1 | 1/2015 | Roberts et al. |
| 2015/0084981 A1* | 3/2015 | Clarberg ................. G06T 11/40 345/614 |
| 2015/0091903 A1 | 4/2015 | Costello et al. |
| 2015/0130789 A1 | 5/2015 | Heinz et al. |
| 2015/0130813 A1 | 5/2015 | Taraki et al. |
| 2015/0130814 A1 | 5/2015 | Taraki et al. |
| 2015/0130815 A1 | 5/2015 | Taraki et al. |
| 2015/0131969 A1 | 5/2015 | Taraki et al. |
| 2015/0133214 A1 | 5/2015 | Heath et al. |
| 2015/0133216 A1 | 5/2015 | Heinz et al. |
| 2015/0134770 A1 | 5/2015 | Heinz et al. |
| 2015/0134771 A1 | 5/2015 | Kalman et al. |
| 2015/0134772 A1 | 5/2015 | Heinz et al. |
| 2015/0134779 A1 | 5/2015 | Thompson et al. |
| 2015/0134840 A1 | 5/2015 | Thompson et al. |
| 2015/0142925 A1 | 5/2015 | Hix et al. |
| 2015/0187333 A1 | 7/2015 | Loeffler et al. |
| 2015/0200983 A1 | 7/2015 | Pearce et al. |
| 2015/0249623 A1 | 9/2015 | Phillips et al. |
| 2015/0281258 A1 | 10/2015 | Watkins et al. |
| 2015/0331813 A1 | 11/2015 | Perrin et al. |
| 2016/0012465 A1 | 1/2016 | Sharp et al. |
| 2016/0044125 A1 | 2/2016 | Hardin et al. |
| 2016/0073286 A1 | 3/2016 | Wang et al. |
| 2017/0300368 A1 | 10/2017 | Jain et al. |

FOREIGN PATENT DOCUMENTS

| | | |
|---|---|---|
| CN | 102867073 A | 1/2013 |
| EP | 2073486 A1 | 6/2009 |
| EP | 1290642 B1 | 9/2010 |
| JP | 2000-132705 A | 5/2000 |
| JP | 2004-266575 A | 9/2004 |
| JP | 2006-061716 A | 3/2006 |
| JP | 2006-279544 A | 10/2006 |
| JP | 2007-011494 A | 1/2007 |
| JP | 2009-003584 A | 1/2009 |
| JP | 2010-176662 A | 8/2010 |
| JP | 2010-224914 A | 10/2010 |
| JP | 2011-511367 A | 4/2011 |
| JP | 2012-069011 A | 4/2012 |
| JP | 2012-143012 A | 7/2012 |
| JP | 2012-245347 A | 12/2012 |
| WO | WO 2012/079825 A1 | 6/2012 |
| WO | WO 2012/107739 A2 | 8/2012 |
| WO | WO 2013/069654 A1 | 5/2013 |

OTHER PUBLICATIONS http://commons.wikimedia.org/wiki/File:Stereoscopic_3D_render_from_Blender.jpg;_File:Stereoscopic_3D_render_from_Blender.jpg; Wikimedia; Mar. 4, 2012; accessed Nov. 12, 2013; 2 pages.

http://en.wikipedia.org/wiki/Mipmap; Mipmap; Wikipedia; Oct. 29, 2013; accessed Nov. 10, 2013; 3 pages.

http://en.wikipeida.org/wiki/Texture_atlas; Texture atlas; Wikipedia; Sep. 28, 2013; accessed Nov. 10, 2013; 2 pages.

http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

Hasselgren et al.; "An Efficient Multi-View Rasterization Architecture"; Proceedings of the 17$^{th}$ Eurographics Conf. on Rendering Techniques; Jun. 2006; 12 pages.

Sorbier et al.; "GPU-based multi-view rendering"; 3$^{rd}$ Annual Int'l Conf. on Computer Games, Multimedia and Allied Technology (CGAT); 2010; 8 pages.

Hubner et al.; "Single-Pass Multi-View Rendering"; IADIS Int'l Journal on Computer Science and Information Systems; vol. 2 No. 2; 2007; p. 122-140.

European Patent Application No. 14860984.5; Extended Search Report; dated May 26, 2017; 14 pages.

European Patent Application No. 14860565.2; Extended Search Report; dated May 10, 2017; 9 pages.

"Remote Session Environment";https://technet.microsoft.com/de-de/library/ee791847(v=ws.10).aspx; Microsoft; ® 2017; accessed Jul. 18, 2017; 8 pages.

European Patent Application No. 14859905.3; Extended Search Report; dated Jun. 27, 2017; 10 pages.

Ekelin et al.; "Real-Time Measurement of End-to-End Available Bandwidth using Kalman Filtering"; Proc. 10$^{th}$ IEEE/IFIP Network Operations and Management Symposium; 2006; 12 pages.

\* cited by examiner

| 300 | render call | | |
|---|---|---|---|
| 310A | object type | | |
| 310B | viewpoint | | |
| | 311A | viewpoint distance | |
| | 311B | viewpoint direction | |
| 310C | size | | |
| 310D | color | | |
| 310E | texture | | |
| 310F | light source | | |
| | 312A | light source intensity | |
| | 312B | light source distance | |
| | 312C | light source direction | |
| 310G | rotation | | |
| 310H | reflectivity | | |
| 310I | time | | |
| 310J | shading | | |

FIG. 3

| 400 | render call | |
|---|---|---|
| 410A | object type = TREE | |
| | 421A | season |
| | 421B | tree kind |
| 410B | viewpoint (trunk center point) | |
| | 411A | viewpoint distance |
| | 411B | viewpoint direction |
| 410C | size | |
| | 422A | tree height |
| | 422B | longest branch length |
| | 422C | trunk base diameter |
| 410D | color | |
| | 423A | tree trunk color |
| | 423B | tree leaves color |
| 410E | texture | |
| | 424A | tree trunk texture |
| | 424B | tree leaves texture |
| 410F | light source | |
| | 412A | light source intensity |
| | 412B | light source distance |
| | 412C | light source direction |
| 410G | rotation | |
| 410H | reflectivity | |
| 410I | time | |
| 410J | shading | |

FIG. 4

| 500 | generate graphics commands call | | |
|---|---|---|---|
| 310A | object type | | |
| 310B | viewpoint | | |
| | | 311A | viewpoint distance |
| | | 311B | viewpoint direction |
| 310C | size | | |
| 310D | color | | |
| 310E | texture | | |
| 310F | light source | | |
| | | 312A | light source intensity |
| | | 312B | light source distance |
| | | 312C | light source direction |
| 310G | rotation | | |
| 310H | reflectivity | | |
| 310I | time | | |
| 310J | shading | | |

FIG. 5

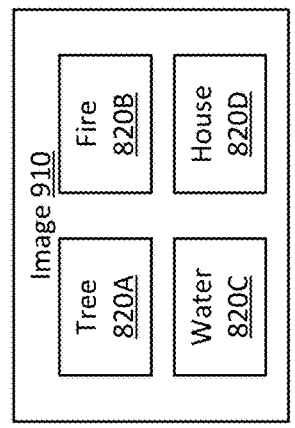
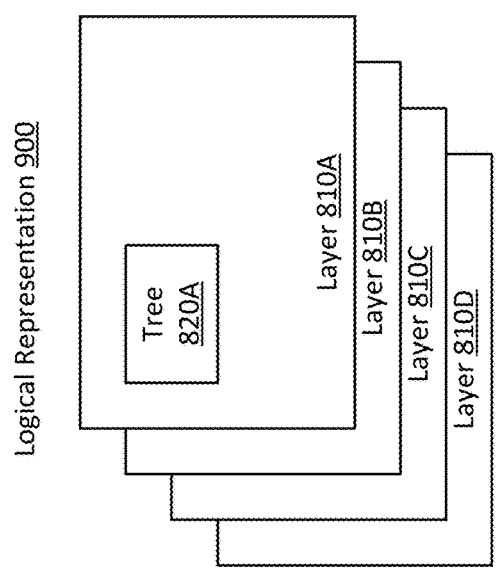
FIG. 9

SERVICE FOR GENERATING GRAPHICS OBJECT DATA

CROSS REFERENCE TO RELATED APPLICATIONS

This application is a continuation of and claims priority to application Ser. No. 14/077,127 filed Nov. 11, 2013, the entirety of which is hereby incorporated by reference. This application is also related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/076,815 filed Nov. 11, 2013, entitled "LOCATION OF ACTOR RESOURCES"; U.S. patent application Ser. No. 14/077,146 filed Nov. 11, 2013, entitled "SESSION IDLE OPTIMIZATION FOR STREAMING SERVER"; U.S. patent application Ser. No. 14/077,023 filed Nov. 11, 2013, entitled "APPLICATION STREAMING SERVICE"; U.S. Patent Application No. 61/902,740 filed Nov. 11, 2013, entitled "EFFICIENT BANDWIDTH ESTIMATION".

BACKGROUND

Computer graphics content items such as video games are becoming increasingly popular and widespread. When content is eventually presented to end users, scenes of the content may be used to generate resulting images for display. The resulting images may be generated by way of a process commonly referred to as rendering, which may, for example, incorporate concepts such as projection, reflection, lighting, shading and others. For example, some graphics content may be three-dimensional content, which is content having associated three-dimensional scenes that may be used to render resulting two-dimensional images. Some other graphics content may be two-dimensional content, which is content having associated two-dimensional scenes that may be used to render resulting two-dimensional images. The term scene, as used herein, refers to a representation that may be used in association with generation of an image. Rendering and other procedures associated with graphics content often involve highly complex and computationally intensive operations. For these and other reasons, rendering and other related procedures are typically performed by components, such as graphics processing units, that are specialized for graphics processing.

The inclusion of highly detailed and complex graphical objects may often be used as selling points for graphics content items that may distinguish them favorably from other products. For example, content users may desire to view images with detailed displays of nature related objects such as trees, water and fire. Each of these example objects may be displayed with highly detailed textures and color arrangements, for example, to represent features such as leaves on a tree, waves in an ocean and flames in a fire. As another example, it may also be desirable to display clothing and cloth objects with highly decorative and intricate patterns and designs. The need to quickly render these and other highly detailed objects in multiple images may place a heavy operational burden on graphics processing units and associated components. In some cases, this heavy operational burden may cause images to be displayed at a lower quality and/or slower speed than desired.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a diagram illustrating a first example logical configuration for describing a graphics object that may be used in some embodiments.

FIG. 4 is a diagram illustrating a second example logical configuration for describing a graphics object that may be used in some embodiments.

FIG. 5 is a diagram illustrating a third example logical configuration for describing a graphics object that may be used in some embodiments.

FIG. 9 is a diagram illustrating a first example technique for combining graphics objects that may be used in some embodiments.

DETAILED DESCRIPTION

Figure 1:
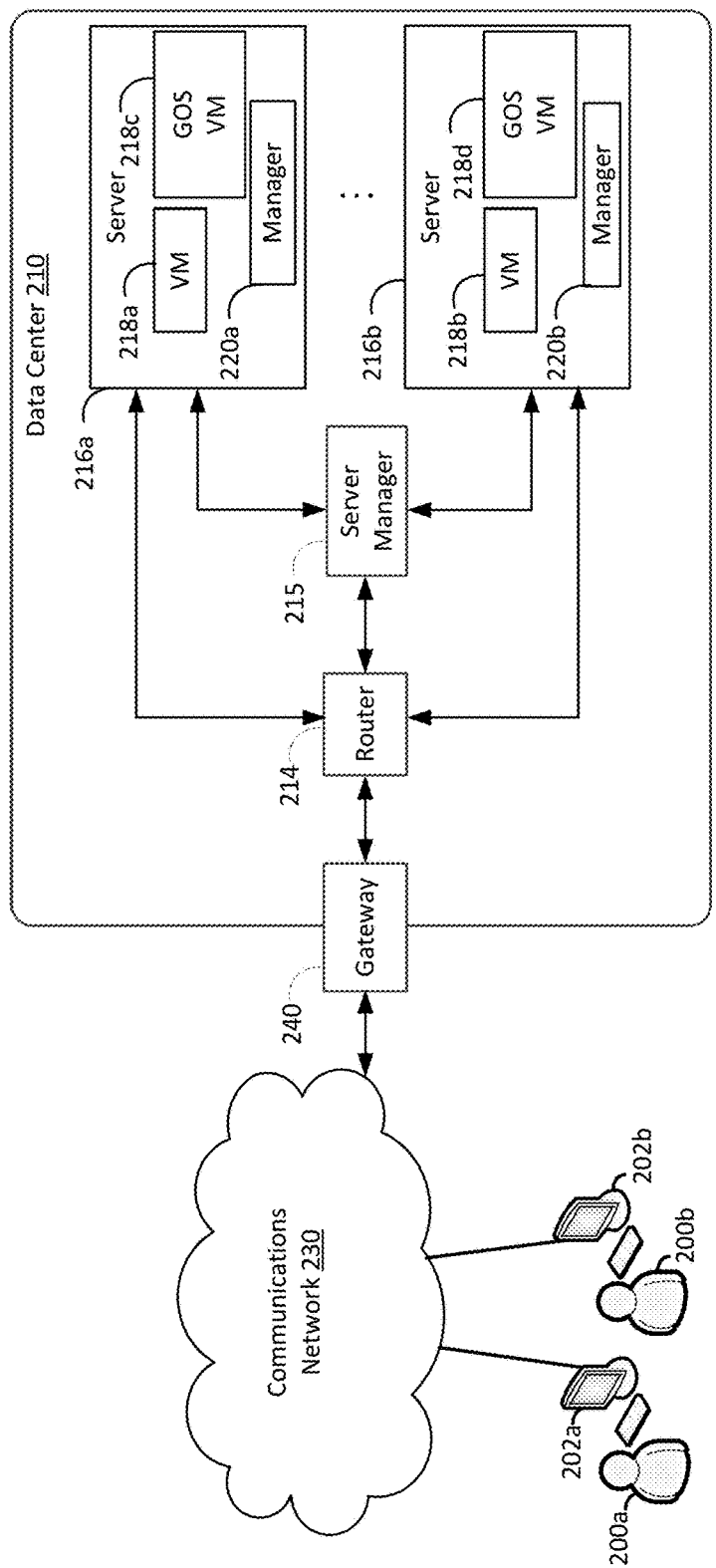
FIG. 1 is a diagram illustrating an example computing system that may be used in some embodiments.

In general, this disclosure describes techniques for operation of a graphics object service that provides graphics object data for graphics content such as video games. In accordance with the disclosed techniques, a graphics object service may be marketed or publicized to graphics content developers for generating data associated with graphics objects such as trees, fire, water, clouds, cloths, clothing humans, animals and others. In some cases, information for communicating with the graphics object service may also be provided. For example, information associated with an application programming interface (API) may be exposed that enables graphics object data to be requested and described in a format that is understandable by the graphics objects service. The API may have associated parameters for describing features of objects such as type, allowable delay, time, depth, shading, latency, size, color, texture and others. Content developers may use the API information to, for example, insert, into a content item, various requests to obtain graphics object data from the graphics objects service.

When a content item is executed at a client device, the content item may generate various scenes or portions of scenes for display. When a scene is generated, the content item may identify any graphics object service requests associated with the scene. Each scene may have any number of associated graphics object service requests that may be sent to any number of different graphics object services. For example, a particular scene may include a tree, fire, water and a house. The content item may, for example, request rendering of the tree from a tree service, rendering of fire from a fire service, rendering of water from a water service and rendering of the house locally by the client device. The graphics object services may be accessible over a network such as the Internet and may be distributed across any number of computing devices. The graphics object services may, in some cases, employ state of the art graphics processing units and other associated graphics components. By requesting object data from graphics object services, a content item may, for example, reduce at least part of the computational burden on a graphics processing unit of the client device, while also making use of the additional, and sometimes more advanced, graphics processing components operated by the graphics object services.

When a graphics object service request is identified, the request may be sent over a network to a graphics object service associated with the request. The request may, in some cases, describe the requested object in association with a two-dimensional or three-dimensional scene. The request and the associated description may, for example, be in a format that is understandable by the associated graphics object service, such as a format corresponding to API information associated with the graphics object service. In some cases, the request may instruct the graphics object service to provide either data associated with a rendered object or data associated with graphics commands for rendering the object. Upon receiving the request, the graphics object service may generate and return the requested data to the client.

Upon receiving the requested data from the graphics object service, the client device may compile an image of the scene by combining the requested graphics object data with other graphics object data that may be generated locally at the client and/or at other graphics object services. Various techniques may be employed to combine the object data from the client device and the different graphics object services. In particular, one example combination technique may employ an image representation having multiple layers. Each layer of the representation may correspond to a respective portion of the image. For example, a first layer may include a first portion of the image rendered by a first graphics object service, while a second layer may include a second portion of the image rendered by a second graphics object service. Another example object combination technique may involve inserting rendered objects into identified areas within the image. For example, a first object rendered by a first graphics object service may be inserted at a first identified image area, while a second object rendered by a second graphics object service may be inserted at a second identified image area. To assist with blending of objects rendered based on data from different sources, various filtering techniques and visual effects, such as blurring effects, may be applied, for example, at border areas between the different objects.

As set forth above, a graphics object service may, receive requests for graphics object data and provide graphics object data to requesting devices. An example computing environment in which a graphics object service may operate will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a-b (which may be referred herein singularly as server 216 or in the plural as servers 216) that provide computing resources. These resources may be available as bare metal resources, or as virtual machine instances 218a-d and (which may be referred herein singularly as virtual machine instance 218 or in the plural as virtual machine instances 218). Virtual machine instances 218c and 218d are graphics object service ("GOS") virtual machine instances. The GOS virtual machine instances 218c and 218d may be configured to perform all or any portion of the graphics object service techniques in accordance with the present disclosure and described in detail below. As should be appreciated, while the particular example illustrated in FIG. 1 includes one GOS virtual machine in each server, this is merely an example. A server may include more than one GOS virtual machine or may not include any GOS virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
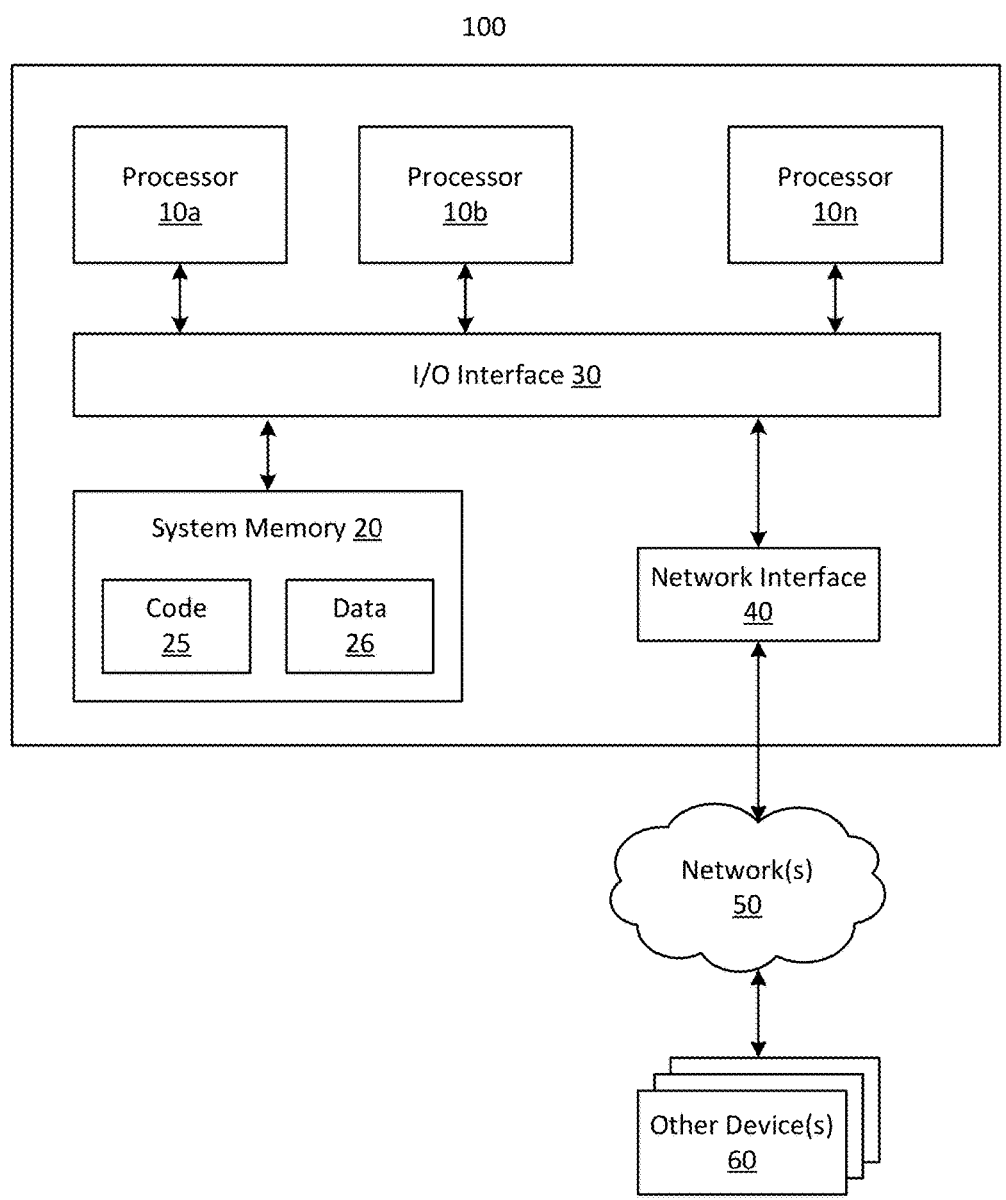
FIG. 2 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 100 via I/O interface 30. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 100 as system memory 20 or another type of memory. Further, a computer-accessible medium may include transmission media or signals such as electrical, electromagnetic or digital signals conveyed via a communication medium such as a network and/or a wireless link, such as those that may be implemented via network interface 40. Portions or all of multiple computing devices such as those illustrated in FIG. 2 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, in accordance with the disclosed techniques, a graphics object service may be employed to generate data associated with one or more objects. The term object, as used herein, refers to any portion of a scene, image or other collection of information. An object may be, for example, a particular pixel or collection of pixels. An object may be, for example, all or any portion of a particular asset. An object may also be, for example, all or any portion of a collection of assets. An object may also be, for example, all or any portion of an entity such as a tree, fire, water, a cloud, a cloth, clothing, a human, an animal and others. For example, an object may be a portion of a tree. An object may also, for example, include all or any portion of a collection of objects, entities and/or assets. For example, an object may be a group of multiple trees or clouds that may be located, for example, at any location with respect to one another.

A graphics object service may be marketed or publicized to graphics content developers. In some cases, a graphics objects service may specialize in certain types of objects. For example, one graphics objects service may specialize in rendering fire, while another graphics objects service may specialize in rendering water. In some cases, a specialized location such as a specialized website may be provided for various different graphics object services to advertise their services. A graphics object service may reside on one or more servers. The service may be scalable to meet the demands of one or more customers and may increase or decrease in capability based on, for example, the number and type of incoming client requests. For certain objects, graphics object services may process graphics objects in parallel across multiple nodes of the graphics objects services. This may be done, in one embodiment, to reduce the latency for rendering the graphics object. Portions of the graphics object service may also be migrated to be placed in a position of reduced latency with a requesting client.

A graphics object service may provide information for communicating with the graphics object service to request and obtain graphics object data. For example, information associated with an application programming interface (API) may be exposed that enables graphics object data to be requested and described in a format that is understandable by the graphics object service. Some example API information that provides instructions for describing a requested object will now be described in detail. In particular, FIG. 3 depicts an example logical configuration associated with an example API call. As shown in FIG. 3, the example API call is a render call 300, which provides instructions for the graphics object service to render an object described by the render call 300.

Type parameter 310A provides information that describes a type of object that is requested for rendering. As set forth above, some example object types include trees, fire, water, clouds, cloths, clothing, humans, animals and any portion of one or more of these or others. In some cases, a particular graphics object service may only render a single, specialized object type, and it may not be necessary to specify a requested object type.

In some cases, depending upon the values of certain parameters or sub-parameters, the logical configuration shown in FIG. 3 may be adjusted as necessary to include parameters that better reflect the object being described. For example, in some cases, depending upon the type of object being described, a number of parameters and sub-type parameters may be added, removed or modified. Some example adjustments to a logical configuration are illustrated in FIG. 4 and described below with respect to FIG. 4.

Referring back to FIG. 3, viewpoint parameter 310B provides information regarding an object's placement with respect to a viewpoint of a scene. Viewpoint parameter 310B includes viewpoint distance sub-parameter 311A and viewpoint direction sub-parameter 311B. Viewpoint distance sub-parameter 311A may indicate a straight line distance from the scene viewpoint to a reference point associated with the object. Viewpoint direction sub-parameter 311B may indicate a direction of the straight line distance from the scene viewpoint. In some cases, the reference point of the object may correspond to, for example, a three-dimensional center point or origin of the object, while, in other cases, the reference point of the object may correspond to, for example, a point associated with a prominent feature of the object. Additionally, in some cases, depending upon the type of object being requested, it may be desirable to specify multiple reference points for the object. In such cases, values for viewpoint distance sub-parameter 311A and viewpoint direction sub-parameter 311B may be identified for each such reference point.

In some cases, an object's depth in association with a viewpoint of a scene may be calculated based on distance sub-parameter 311A and direction sub-parameter 311B. Also, in some cases, an object's depth in association with a viewpoint of a scene may, for example, be indicated based on a separate depth parameter or depth sub-parameter.

As should be appreciated, because the viewpoint parameter 310B and its associated sub-parameters 311A and 311B are dependent upon the scene viewpoint, these parameters may change when the scene viewpoint changes. In some cases, changes in scene viewpoint may occur rapidly, sometimes even occurring with each newly generated scene. This is in contrast with other parameters such as type parameter 310A, size parameter 310B and other parameters that may, in some cases, change less frequently.

Size parameter 310C indicates the size of the object. In some cases, size parameter 310C may correspond to the object's abstract size as opposed to the object's perceived size when represented at a particular distance. As should be appreciated, the object's perceived size may, in some cases, be calculated based upon size parameter 310C and viewpoint distance sub-parameter 311A. In some cases, if it is desired to have a particular content item calculate the object's perceived size, then the perceived size may also be provided as an additional or alternative parameter. In other cases, however, size parameter 310C may be employed to correspond to the object's abstract size. Depending upon the type of object selected, different sizes may be specified for different portions or areas of the object. Additionally, depending upon the particular object or area being described, any combination of different size measurement attributes such as length, width, height, radius, diameter, volume and others may be employed. Some examples of multiple size parameters for different object areas are described below with respect to FIG. 4.

Color parameter 310D provides information about the color of an object. A single color or a range of different colors may be specified for color parameter 310D. Additionally, depending upon the type of object being requested, different color parameters may be specified for different portions or areas of the object. Some examples of multiple color parameters for different object areas are described below with respect to FIG. 4.

Texture parameter 310E provides information about the texture of an object. A single texture or a range of different texture may be specified for texture parameter 310E. Additionally, depending upon the type of object being requested, different texture parameters may be specified for different portions or areas of the object. Some examples of multiple texture parameters for different object areas are described below with respect to FIG. 4.

Light source parameter 310F provides information about a light source associated with the scene. Light source parameter 310F includes light source intensity sub-parameter 312A, light source distance sub-parameter 312B and light source direction sub-parameter 312C. Light source intensity sub-parameter 312A indicates an intensity of the light source. Light source distance sub-parameter 312B indicates a straight line distance of the light source from a reference point associated with the object. Light source direction sub-parameter 311B may indicate the direction of the straight line distance. The reference point of the object associated with light source parameter 310F may be the same or different from the reference point of the object associated with viewpoint parameter 310B. As should be appreciated, in some cases, a scene may include multiple light sources, and values for light source parameter 310F and its sub-parameters 312A-C may be provided for any or all of these multiple light sources.

Rotation parameter 310G provides information about the rotation of an object. In some cases, rotation parameter 310G may be specified using measurements such as degrees. For example, in some cases, a human character standing directly in front of a scene viewpoint and directly facing the scene viewpoint may be expressed as standing at 0 degrees or 360 degrees. By contrast, a human character standing directly in front of a viewpoint while facing directly away from the scene viewpoint (i.e., with his back to the viewer) may be expressed as standing at 180 degrees. In some cases, rotation parameter 310G may include three sub-parameters, for example, to indicate rotation with respect to axes of a three-dimensional scene, which may commonly be referred to as the X, Y and Z axes. In other cases, greater or fewer than three sub-parameters may be included. Additionally, depending upon the type of object being requested, different rotation parameters 310G may be specified for different portions or areas of the object.

Reflectivity parameter 310H may indicate a degree of reflectivity of an object. For example, objects such as glass and water may tend to have higher reflectivity than objects such as trees or cloth. In some cases, reflectivity may be determined based on the type of object selected and need not necessarily be specified. Also, in some cases, reflections may be added to the object by, for example, the client device and need not be handled by the graphics object service. When an object is reflective and it is desired to have at least a portion of the reflection rendered or otherwise processed by the graphics object service, additional information about the scene may sometimes be provided to the graphics object service in order to assist the graphics object service in rendering or processing the reflection.

Time parameter 310I may indicate a time associated a request. Time parameter 310I may indicate, for example, a desired time at which the client device would like to receive all or any portion of data requested from the graphics object service. Time parameter 310I may also indicate, for example, an allowable delay time associated with generating, transmitting and/or receiving requested data. Time parameter 310I may also indicate, for example, an allowable latency associated with generating, transmitting and/or receiving requested data. Time parameter 310I may, for example, include any number of sub-parameters corresponding to attributes such as allowable delay and/or latency. Time parameter 310I may, for example, help the client device to better organize or schedule when it receives results associated with a number of different requests. In some cases, time parameter 310I may allow the client to create a schedule according to a logical progression, whereby results that are needed earlier are scheduled to be received at an earlier time, while results that are not needed until later may be scheduled to be received at a later time. Also, in some cases, time parameter 310I may allow the client to create a schedule such that related results are received within a desired temporal proximity of one another.

Shading parameter 310J may include any information associated with shading of an object and/or one or more portions of an object. Shading parameter 310J may, for example, include any number of sub-parameters associated with different portions of an object. Shading parameter 310J may also include, for example, information associated with varying levels of light and/or color. Shading parameter 310J may also include, for example, information that may indicate various angles of portions of an object with respect to one or more light sources. Shading parameter 310J may also include, for example, information that may indicate various types of shading such as flat shading or smooth shading.

As set forth above, an association of a number of the parameters and sub-parameters of render call 300 may be dependent upon the values of other parameters and sub-parameters of render call 300. To illustrate these concepts, FIG. 4 depicts a logical configuration associated with an example API call for a particular example object. In particular, as shown in FIG. 4, type parameter 410A indicates that the selected object type is a tree. Thus, render call 400 of FIG. 4 will cause a graphics object service to render a tree.

As also shown in FIG. 4, type parameter 410A includes season sub-parameter 421A and tree kind sub-parameter 421B. Season sub-parameter 421A indicates a season (e.g., summer, winter, spring or autumn) for a tree. The tree's appearance may vary depending upon the selected season. For example, in some cases, a tree in the summer may be full of large green leaves, a tree in the winter may have no leaves or a few brown leaves, a tree in the spring may have small green leaves and a tree in autumn may have red, yellow and orange leaves. Tree kind sub-parameter 421B indicates a selected kind of tree such as, for example, a pine, maple, oak, spruce and others. As should be appreciated, the season and tree kind are merely some examples of sub-parameters that may be associated with a tree and are non-limiting.

As should be appreciated, FIG. 3, which is not specifically tied to the tree object type, does not include a season sub-parameter or a tree kind sub-parameter. The inclusion of sub-parameters 421A and 421B in render call 400 may be associated with a selection of a tree as the object type for render call 400. This is because sub-parameters 421A and 421B are specially related to the tree object type. For example, while a tree's appearance may vary depending upon the selected season, the appearance of other types of objects such as fire and water may not substantially vary based on season. Other types of objects may have any number of other specially related sub-parameters. For example, a human object type may have sub-parameters such as age, gender, hair type, body type and others.

Viewpoint parameter 410B of FIG. 4 indicates that the reference point for the viewpoint parameter is the center point of the tree trunk. Thus, viewpoint distance sub-parameter 411A indicates the straight line distance from the scene viewpoint to the center point of the tree trunk. Viewpoint direction sub-parameter 411B indicates the direction of the straight line distance from the scene viewpoint to the center point of the tree trunk. As should be appreciated, the center point of the tree trunk is merely one example of a reference point that may be associated with a tree and is non-limiting.

Size parameter 410C of FIG. 4 includes tree height sub-parameter 422A, longest branch length sub-parameter 422B and trunk base diameter sub-parameter 422C. Tree height sub-parameter 422A indicates the desired height of the tree. Longest branch length sub-parameter 422B indicates the length of the longest branch of the tree. Trunk base diameter sub-parameter 422C indicates the diameter of the tree trunk at its base. As should be appreciated, the sub-parameters 422A-422C are merely some examples of different portions of a tree for which sizes may be specified and are non-limiting. For example, in some cases, only a single size may be specified for the entire tree, and sizes for different portions of the tree may be calculated or determined automatically by the graphics object service.

Color parameter 410D of FIG. 4 includes tree trunk color sub-parameter 423A and tree leaves color sub-parameter 423B. Tree trunk color sub-parameter 423A indicates a color of the tree trunk, while tree leaves color sub-parameter 423B indicates a color of the tree leaves. As should be appreciated, the sub-parameters 423A-423B are merely some examples of different portions of a tree for which colors may be specified and are non-limiting.

Texture parameter 410E of FIG. 4 includes tree trunk texture sub-parameter 424A and tree leaves texture sub-parameter 424B. Tree trunk texture sub-parameter 424A indicates a texture of the tree trunk, while tree leaves texture sub-parameter 424B indicates a texture of the tree leaves. As should be appreciated, the sub-parameters 424A-424B are merely some examples of different portions of a tree for which texture s may be specified and are non-limiting.

The remaining parameters of FIG. 4 include light source parameter 410F, light source intensity sub-parameter 412A, light source distance sub-parameter 412B and light source direction sub-parameter 412C, rotation parameter 410G, and reflectivity parameter 410H, time parameter 410I and shading parameter 410J. These parameters are described above and will not be described again in detail here. However, it is noted that any or all of these parameters may be removed, expanded or adjusted as desired in order to appropriately describe attributes of a tree, and these adjustments may include, for example, including any additional desired parameters or sub-parameters.

As set forth above, in addition to rendering objects, a graphics object service may also be employed to generate graphics commands that may be executed, for example, in order to render an object. These commands may include, for example, instructions for operations such as projection, shading, reflection, lighting and others. FIG. 5 depicts an example logical configuration associated with an example API call for generating graphics commands. As shown in FIG. 5, the logical configuration includes a generate graphics commands call 500, which provides instructions for a graphics object service to generate graphics commands for an object described by the call 500. The example logical configuration shown in FIG. 5 is identical to the example logical configuration shown in FIG. 3, with the exception that render call 300 of FIG. 3 is replaced with generate graphics commands call 500. It is noted, however, that the logical configurations and calls depicted in FIGS. 3 and 5 need not necessarily include identical sets of parameters.

It is noted that the logical configurations depicted in FIGS. 3-5 and described above are merely examples and that any number of additional, fewer or alternative logical configurations may be employed including any number of additional, fewer or alternative calls, parameters, sub-parameters and other features. Additionally, it is noted that, while graphics objects data may, in some cases, be requested and described in accordance with information associated with an API, the disclosed techniques are not limited to use with API's. Rather, any appropriate technique may be employed for requesting and describing graphics objects data.

Thus, as described above, graphics object data may be requested from a graphics object service based on, for example, information provided by the graphics object service for communicating with the graphics object service. Such information may be employed to embed or insert graphics object service requests into a particular content item such as a video game. When a content item is executed at a client device, the content item may generate various scenes or portions of scenes for display. When a scene is generated, the content item may identify any graphics object service requests associated with the scene. Each scene may have any number of associated graphics object service requests that may be sent to any number of different graphics object services. For example, a particular scene may include a tree, fire, water and a house. The content item may, for example, request rendering of the tree from a tree service, rendering of fire from a fire service, rendering of water from a water service and rendering of the house locally by the client device.

A graphics object service request may include, for example, a call or other command for requesting graphics object data such as the example API calls 300, 400 and 500 described above or any other appropriate call or command. A graphics object service request may include, for example, information for identifying and establishing communications with a graphics object service such as an Internet Protocol (IP) or other communications address. A graphics object service request may also include, for example, information identifying an account associated with the request and identifying payment for the requested graphics object data.

Accounts may be opened with a graphics object service using a number of techniques. For example, when a content item is purchased, a seller of the content item may prompt a purchaser to open an account with one or more graphics object services. In some cases, if authorized by the purchaser, the same purchaser information and payment method used to purchase the content item may be provided to one or more graphics object services. For example, if authorized by the purchaser, the purchaser's name and credit card information may be provided to one or more graphics object services. As another example, code may be included within the content item to determine when the content item is being used for the first time and, on such occasions, may prompt the user to open an account with one or more graphics object services. In some cases, there may be a permanent or temporary option on a navigation menu associated with the content item for opening an account with one or more graphics object services. The content item may, for example, include code for communicating with the graphics object services and for obtaining any necessary information from the user in order to open an account.

In some cases, an account may be opened using a telephone or using the Internet by, for example, navigating to a particular web page associated with a graphics object service and opening an account. In some cases, payment information such as a credit card number may be required to open an account, while, in other cases, such information may not be required or may be provided at a later time. An account may, for example, be associated with a particular user or group of users, a particular device or group of devices, a particular content item or group of content items or any combination of these or other entities.

A number of different techniques may be employed to identify a particular account. For example, in some cases, an account may be identified by a particular identifier such as a user name. In some cases, if an account is associated with a particular content item, then the account may be identified by an identifier assigned to the content item. Additionally, in some cases, if an account is associated with a particular device, then the account may be identified by a hardware identifier or software identifier assigned to the particular device.

In some cases, it may be desirable to validate the use of the account to ensure that the account is being used in an authorized manner. A number of different techniques may be employed to validate a use of an account. In some cases, if a request specifies an authorized device or address to which to return the requested graphics object data, then it may be assumed that the account is being used by an authorized entity. Additionally, in some cases, a validation identifier such as a password may be employed to validate the use of the account. For example, prior to playing a video game that includes one or more graphics object service requests, a user may be prompted to enter a password associated with his account. The password may then be provided to the graphics object services, for example, either at the beginning of a game session and/or along with each individual request. In some cases, graphics object service requests may only be provided to graphics object services for which a password is received and validated, while graphics object service requests to services with non-received or non-validated passwords may be ignored.

Any number of different approaches may be employed to determine costs for graphics service requests. For example, in some cases, an account may be billed individually for each request. Additionally, in some cases, there may be a single flat fee for each individual request. In other cases, the cost per request may vary depending on factors such as a number of requests over a particular time period, the complexity of the request, the size of the object associated with the request, the type of the object associated with the request, the content item for which the request is issued, the account issuing the request and any combination of these or other factors. The complexity of the request may be determined based on factors such as, for example, the number of different colors, textures and areas of the object. For example, a tree in the summer with leaves and birds on its branches may be more complex than a tree in winter with no leaves and no birds.

In some cases, an account holder may purchase or otherwise obtain a subscription associated with an account. The subscription may, for example, charge the account a single flat fee in exchange for an unlimited number of graphics object service requests for a particular time period. For example, an account may be charged a monthly fee for a monthly subscription that entitles the account to an unlimited number of graphics object service requests for a month. In some cases, the subscription may entitle an account to, for example, a limited number of requests or a limited amount of total estimated complexity across any number of requests. After the limit is exceeded, the account may, for example, be charged individually for each request in excess of the specified limit.

Thus, as set forth above, a content item such as a video game may include any number of associated graphics object service requests directed to any number of different graphics object services. Content items including graphics object service requests may, for example, be acquired by client devices and executed at the client devices. When a content item is executed at a client device, the content item may generate various scenes or portions of scenes for display. When a scene is generated, the content item may identify any graphics object service requests associated with the scene. Some scenes may not have any associated graphics object service requests. When a graphics object service request is identified, the request may be sent over a network to a graphics object service associated with the request.

Figure 6:
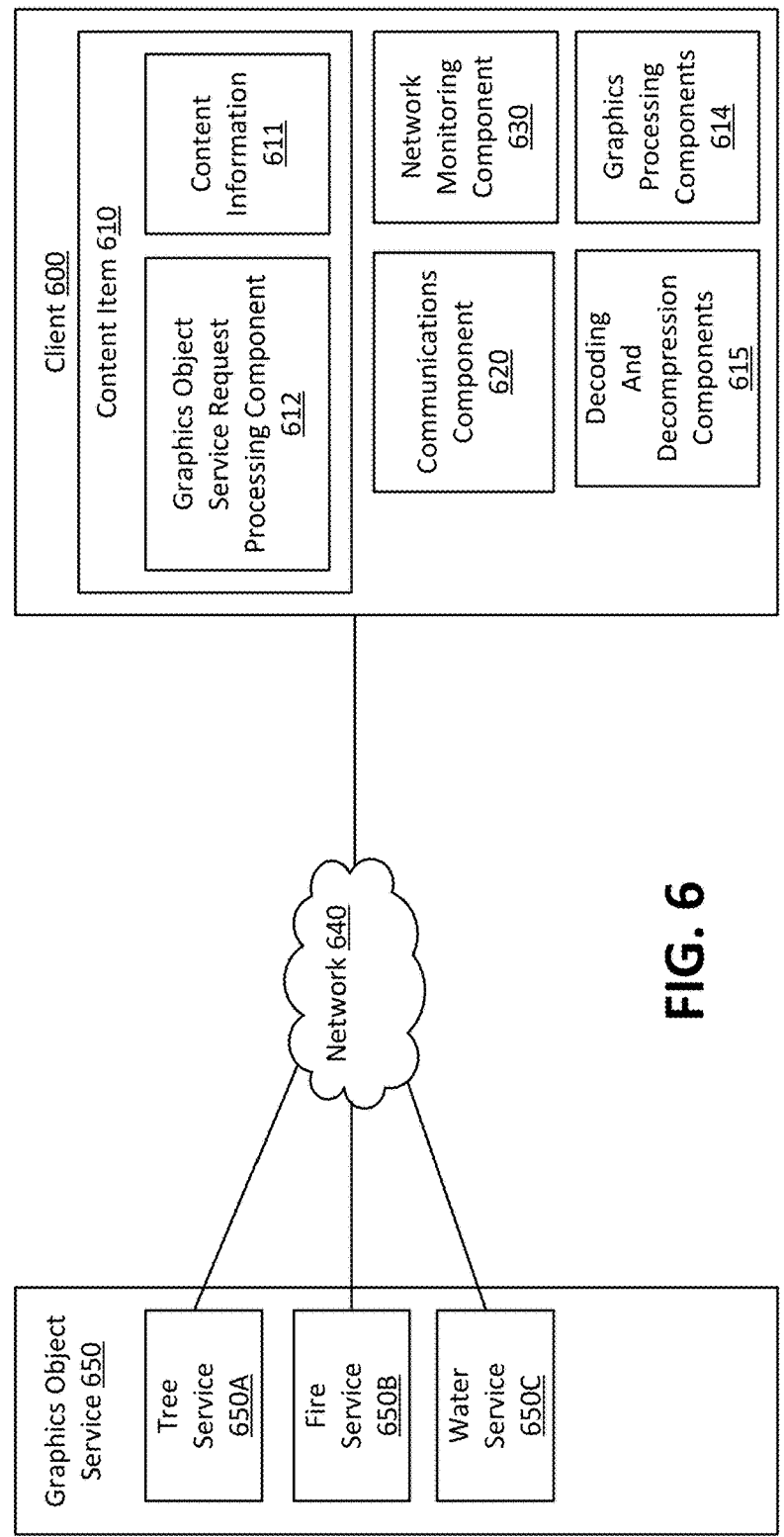
FIG. 6 is a diagram illustrating an example system for interacting with graphics object services in accordance with the present disclosure.

FIG. 6 is a diagram illustrating an example system for interacting with graphics object services in accordance with the present disclosure. As shown in FIG. 6, client device 600 executes content item 610, which includes content information 611 and graphics object service request processing component 612. Content information 611 may include, for example, any data that is used to generate a resulting image displayed in associated with execution of content item 610. Content information 611 may include, for example, information corresponding to scenes associated with the content item 610. Content information 611 may include, for example, information describing two-dimensional or three-dimensional scenes. The two-dimensional or three-dimensional scenes may, for example, be considered logical representations in the sense that they may not physically occupy the areas that they are intended to logically model or represent. A scene may, for example, include or otherwise be associated with information or data that describes the scene. For each scene generated by the content item 610, content information 611 may also include a number of associated graphics object service requests. Some scenes may not have any associated graphics object service requests.

For each scene, graphics object service request processing component 612 may identify any associated graphics object service requests within content information 611. Graphics object service request processing component 612 may then perform operations such as selecting one or more of the identified graphics object service requests for execution, providing each selected request to a communications component 620 for transmission to a corresponding graphics object service 650, monitoring the progress of graphics object service requests, substituting local data for requests that are not satisfactorily fulfilled and managing a combination of received request results with local data in order to compile an image in accordance with the scene.

Upon identifying one or more graphics object service requests associated with a particular scene, graphics object service request processing component 612 may select none, some or all of the identified requests for execution. Graphics object service requests may be selected for execution based on any number of different factors. In some cases, a user may provide input to indicate whether the user desires to issue some or all of the graphics object service requests identified within content information 611. For example, a user may specify certain graphics object services with which the user may or may not want to interact at any given time. In some cases, graphics object service request processing component 612 may be limited to interact only with graphics object services 650 for which a user has provided authorization information such as a validated password.

Additionally, a user may provide input regarding, for example, a desired graphics quality for content item 610. In some cases, in order to save costs associated with graphics object service requests or to possibly improve the display speed of the content item, a user may select to display images with a lower quality. Graphics object service request processing component 612 may select to ignore some or all graphics object service requests based on such graphics quality input.

As another example, graphics object service request processing component 612 may, in some cases, interact with a network monitoring component 630, which may provide information regarding, for example, current or recent network quality of service conditions. In some cases, if network quality of service is unfavorable, graphics object service request processing component 612 may determine that network conditions may prevent some or all graphics object service requests from being received within a desired time period. Graphics object service request processing component 612 may select to ignore some or all graphics object service requests based on this determination.

In some cases, content information 611 may include multiple requests to different graphics object services 650 for providing the same or similar data. This may, for example, allow graphics object service request processing component 612 to make a runtime determination regarding a preferred graphics object service 650 for satisfying the request and providing the data. In some cases, a user may provide input that ranks certain graphics object services 650 by order of user preference. Graphics object service request processing component 612 may use this ranking, or any other user input or other information, to choose between multiple graphics object services 650 for providing the same or similar data.

Upon selecting one or more graphics object service requests for execution, graphics object service request processing component 612 may provide each selected request to communications component 620 for transmission to a graphics object service 650. Some example features of a graphics object service request are described in detail above. Generally, a graphics object service request may include, for example, a request to render an object or provide graphics commands associated with rendering of an object, a description of an object, a description of aspects of a two-dimensional or three-dimensional scene, an address or other information for identifying and establishing communications with a graphics object service, account information payment information such as credit card information and any other appropriate information. As also set forth above, any portion of information in a graphics object service request may be provided in accordance with information associated with an API or any other format understandable by a particular graphics object service. For example, a request may include a call and parameters such as, for example, any one or more of the parameters depicted in FIGS. 3-5 and described above.

While a graphics object service request may, in some cases, include a description of a requested object, a graphics object service request is not required to include an object description. For example, in some cases, as an alternative or in addition to an object description, a graphics object service request may include an identifier associated with an object and/or a pointer to a collection of information associated with a requested object that may describe the requested object. For example, a graphics object service request may include a uniform resource locator (URL) corresponding to a picture or other file associated with a requested object that may describe the requested object.

Service requests to a graphics object service (also referred to herein as "graphics object service requests") may have a variety of different characteristics. For example, service requests may include both web service requests and non-web service requests. Service requests may also be issued using any number of different protocols. For example, service requests may be issued using both protocols that are considered reliable and protocols that are considered non-reliable. Also, for example, service requests may be issued using either hypertext transfer protocol (HTTP) or non-HTTP protocols. In some cases, service requests may be issued using different transport layer protocols such as transmission control protocol (TCP), user datagram protocol (UDP) and others. Service requests and graphics object service requests in accordance with the disclosure herein may include any number of these or other different characteristics.

Communications component 620 may transmit each selected graphics object service request to a corresponding graphics object service 650 using a network 640 such as the Internet. In particular, FIG. 6 depicts three example graphics object services 650 including tree service 650A, fire service 650B and water service 650C. As should be appreciated, however, while three example graphics object services 650A-C are depicted in FIG. 6, the disclosed techniques may be employed in connection with any number of different graphics object services. Additionally, there is no requirement that any particular graphics object service specialize in any particular type of object or objects. Rather, a graphics object service in accordance with the disclosed techniques may service graphics object service requests in accordance with any number of different object types.

In some cases, when multiple graphics object service requests are being sent simultaneously or within a certain time period with respect to one another, client 600 may perform various operations to help ensure that client 600 will not be overburdened by attempting to receive too much data when the requests are being returned and received by client 600. For example, in some cases, client 600 may determine a maximum amount of incoming data that it can receive within a particular time period. Client 600 may then allocate a certain proportion of this incoming data to various requests. In some cases, client 600 may use these proportions or other calculations to determine certain encoding bitrates or other transmission parameters that may be used in accordance with returned request results. In some cases, client 600 may perform these operations and provide the resulting determinations to graphic object services 650. In other cases, graphic object services 650 or other components may perform these operations based on information provided by the client 600 and/or other information.

Each graphics object service 650, and any or all of the components operated in association therewith, may be distributed across any number of different computers in any number of different locations. For example, each graphics object service 650 and its components may be distributed across a number of different server computers in one or more data centers. Each graphics object service 650 and its components may, in some cases, be executed in accordance with one or more virtual machine instances. An example system of distributed computers that may be used to execute a graphics object service is described above with reference to FIGS. 1 and 2.

Figure 7:
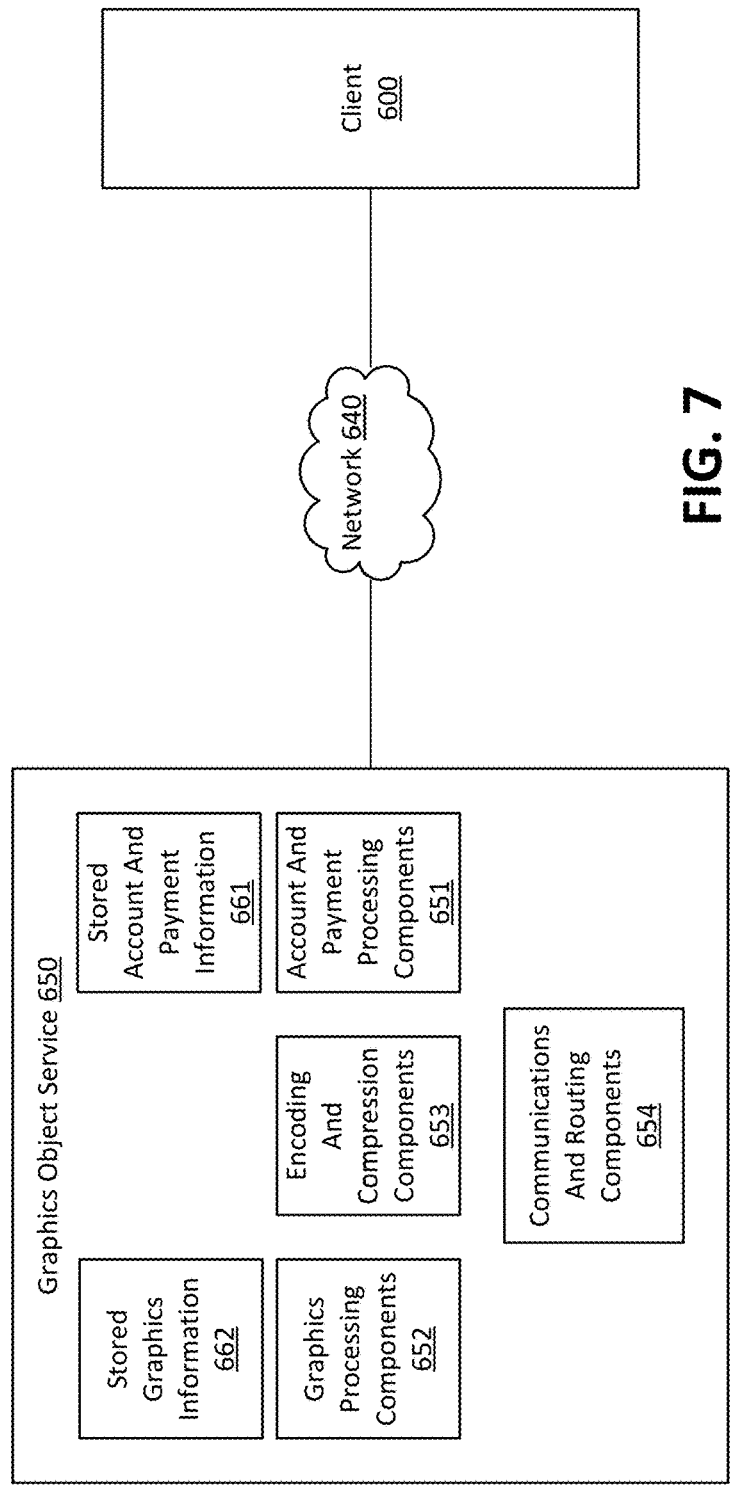
FIG. 7 is a diagram illustrating an example system for implementing a graphics objects service in accordance with the present disclosure.

Additionally, FIG. 7 illustrates an example system for implementing a graphics object service 650. In particular, graphics object service 650 receives incoming requests from client 600 transmitted over network 640. Communications and routing components 654 may be employed to perform various operations such as receiving an incoming request, routing various commands associated with the request to, from and between various other components and transmitting a response to a request back to client 600. In some cases, communications and routing components 654 and/or other components may determine an "edge" of a system or network associated with the graphics object service 650 that is physically and/or logically closest to client 600. The graphics object service may then, for example, "spin-up," migrate resources or otherwise employ components associated with the determined edge for interacting with requests from the client 600. Such an edge determination process may, in some cases, provide an efficient technique for identifying and employing service components that are well suited to interact with a particular client 600, and may, in some embodiments, reduce the latency for communications between a graphics object service and one or more clients.

Account and payment processing components 651 may be employed to perform operations such as identifying an account associated with a request, validating account authorization information, validating payment information and other operations. As set forth above, a graphics object service request may, in some cases, include information for identifying an account associated with the request. This account identification information may include, for example, a user name, an account number, a credit card number, hardware and/or software identifiers associated with the client 600 and/or content item 610, an IP address or other communications address associated with the client 600 or any combination of this or other information.

Additionally, in some cases, a graphics object service request may include account authorization information for validating that the account is being used in an authorized manner. The account authorization information may include, for example, a password, hardware and/or software identifiers, an IP address or other communications address or any combination of this or other information. Account and payment processing components 651 may, for example, validate received account authorization information against information for the identified account within stored account and payment information 661. In some cases, use of account may be presumed to be valid in some or all circumstances, and validation of account authorization information may not be desired.

Furthermore, in some cases, a graphics object service request may include payment information associated with the request. The payment information may include, for example, credit card information, Internet payment account information or any other information. Account and payment processing components 651 may validate received payment information by, for example, confirming that credit card information satisfies valid date and number formats. If the payment information is valid, account and payment processing components 651 may keep the information in stored account and payment information 661. Additionally, in some cases, account and payment processing components 651 revalidate previously received payment type information by, for example, confirming that a credit card has not expired since a previous use.

If, for example, the account authorization information and payment information are sufficient and valid, then account and payment processing components 651 may indicate this to other components of graphics object service 650. By contrast, if, for example, the account authorization information and payment information are insufficient or invalid, then account and payment processing components 651 may provide instructions to send an error message for transmission to client 600 indicating a problem with the request and possibly requesting additional information.

Graphics processing components 652 may include one or more components for performing graphics operations such as rendering an object or generating graphics commands associated with rendering of an object. Rendering of an object may encompass operations such as, for example, projection, reflection, lighting, shading and others. Graphics processing components 652 may include, for example, one or more graphics processing units. In some cases, an indication of sufficient and valid account authorization and payment information may be required prior to beginning graphics processing operations. In some other cases, graphics operations may be initiated without first receiving an indication of sufficient and valid account authorization and payment information, but graphics operations may be stopped if such an indication is not received within a certain time period.

Graphics processing components 652 may access stored graphics information 662, which may include, for example, information associated with one or more different object types. In some cases, graphics processing components 652 may obtain a portion of stored graphics information 662 for a particular object type identified by a request and then combine the stored graphics information 662 with information received in the request. For example, if a request is received for a tree, then graphics processing components 652 may obtain stored graphics information 662 associated with a tree, which may include certain instructions for generating areas of a tree such a trunk, branches and leaves. In some cases, graphics information 662 could include, for example, information that describes the shape of a leaf and some patterns on the surface of the leaf. The leaf could then be colored and textured based on, for example, color and texture information in the received request.

Upon performing graphics processing operations, the processed data may, in some cases, be provided to encoding and compression components 653. Encoding and compression components 653 may generally use any appropriate technique to encode and/or compress graphics data for transmission in response to a graphics object service request. In some cases, it may not be necessary to encode and/or compress the requested graphics data. After any necessary encoding and/or compressing operations are performed, communications and routing components 654 may transmit the requested data over network 640 back to the requesting client 600.

Referring back to FIG. 6, communications component 620 of client device 600 may receive requested graphics object data from one or more graphics object services 650. If necessary, the received graphics object data may be decoded and/or decompressed by decoding and decompression components 615. In some cases, if the received graphics object data includes information describing graphics commands in association with rendering of an object, then the described graphics commands may be provided to graphics processing components 614 for execution of the commands to render the resulting object. Graphics processing components 614 may include, for example, a graphics processing unit.

In some cases, results of a graphics object service request may not be returned to client 600 quickly enough to be incorporated into a resulting image. This may occur, for example, due to technical problems at a graphics object service 650 or network communications problems. In order to deal with these instances, graphics object service request processing component 612 or another component may, in some cases, monitor the progress of results of graphics object service requests. When results are not received within a desired time period, a determination may be made to substitute local data at client 600 for non-received results of a graphics object service request. For example, in some cases, a rendered version of an object from a previous image may be substituted for the object associated with the request. As another example, in some cases, the object may be rendered locally by client 600 as a substitute for the non-received graphics object service request data.

When graphics object data is successfully received from one or more graphics object services 650, client 600 may compile an image of the scene by, for example, combining graphics object data received from one or more graphics object services 650 with data generated based on graphics operations performed locally at client 600. It is unnecessary for client 600 to wait to receive results for all graphics object service requests in order to begin the image compilation process. Rather, in some cases, while one or more graphics objects are being processed by corresponding graphics object services, the image compilation process may be started at client 600 by, for example, providing to graphics processing components 614 data corresponding to portions of an image that are rendered locally. In these and other cases, greater efficiency may be sometimes achieved by processing data for various portions of an image in parallel at both client 600 and one or more graphics object services 650. An image may include, for example, a collection of information associated with a displayable output.

Figure 8:
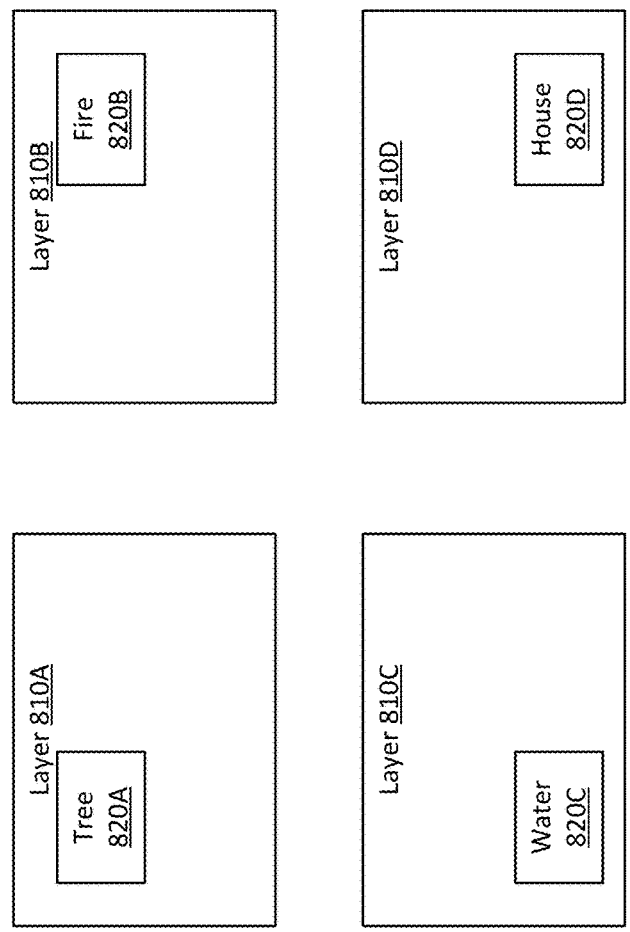
FIG. 8 is a diagram illustrating example image layers that may be used in some embodiments.

Client 600 may employ various techniques for combining graphics object data received from one or more graphics object services 650 with scene data generated locally at client 600. One example combination technique, which is referred to herein as a layering technique, may employ an image representation having multiple layers. Each layer of the representation may correspond to a respective portion of the image. For example, a first layer may include a first portion of the image rendered by a first graphics object service, while a second layer may include a second portion of the image rendered by a second graphics object service. In particular, FIG. 8 depicts four layers 810A, 810B, 810C and 810D. Layer 810A includes a tree 820A received from tree service 650A. Layer 810B includes fire 820B received from fire service 650B. Layer 810C includes water 820C received from water service 650C. Layer 810D includes a house 820D that is rendered locally by graphics processing components 614 of client 600.

An example depiction of the layering technique is illustrated in FIG. 9. In particular, a logical representation 900 is shown, in which layers 810A-D are logically represented as being stacked vertically with layer 810D at the bottom, layer 810C second to the bottom, layer 810B third from the bottom and layer 810A on the top. It is noted that logical representation 900 is not intended to be a physical structure in which layers 810A-D are physically stacked on top and beneath each other. Rather, logical representation 900 is merely a logical representation that is intended to indicate an example manner in which data corresponding to various portions of an image may be logically associated. Additionally, it should be appreciated that the example order of placement of layers shown in FIG. 9 is merely provided for illustrative purposes and is non-limiting. Referring back to FIG. 9, it is shown that logical representation 900 is used to generate a resulting image 910 that includes rendered tree 820A, rendered fire 820B, rendered water 820C and rendered house 820D.

Figure 10:
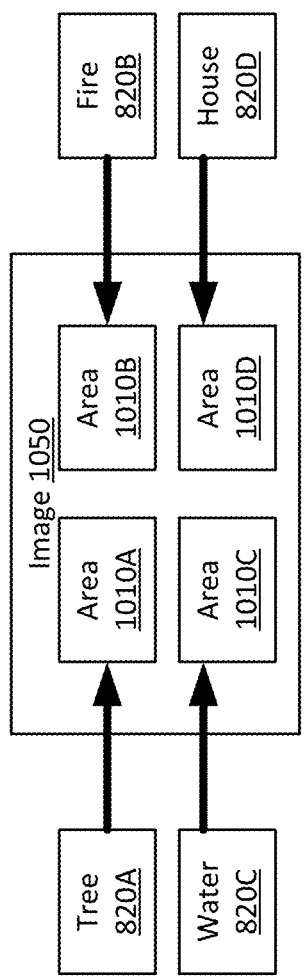
FIG. 10 is a diagram illustrating a second example technique for combining graphics objects that may be used in some embodiments.

Another example combination technique, which is referred to herein as a stitching technique, may involve inserting rendered objects into identified areas within an image. For example, a first object rendered by a first graphics object service may be inserted at a first identified image area, while a second object rendered by a second graphics object service may be inserted at a second identified image area. Each image area may be identified using, for example, coordinate values identified based on content information 611 of FIG. 6, which may describe, for example, a two-dimensional or three-dimensional scene upon which the image is based. An example depiction of the stitching technique is illustrated in FIG. 10. In particular, FIG. 10 depicts image 1050, which includes area 1010A associated with tree 820A, area 1010B associated with fire 820B, area 1010C associated with water 820C and area 1010D associated with house 820D. As shown in FIG. 10, tree 820A is inserted into area 1010A, fire 820B is inserted into area 1010B, water 820C is inserted into area 1010C and house 820D is inserted into area 1010D.

Regardless of which of the above described techniques or other techniques are employed to combine graphics data from graphics object services 650 and client 600, there may be some cases in which combined portions of an image are determined to not blend into one another as smoothly or seamlessly as desired. In these and other cases, a variety of visual effects may be employed to help improve the appearance of combined portions of an image. In some cases, blurring effects and image filtering effects may be applied to image areas such as borders or transition points between objects or combined portions of an image. For example, a tree rendered by a graphics object service 650 may be compiled into an image, but the tree's trunk may not blend into the ground as smoothly as desired. In this example scenario, a blurring effect may be applied to the base of the tree trunk in order to make the trunk appear to blend more smoothly into the ground.

Figure 11:
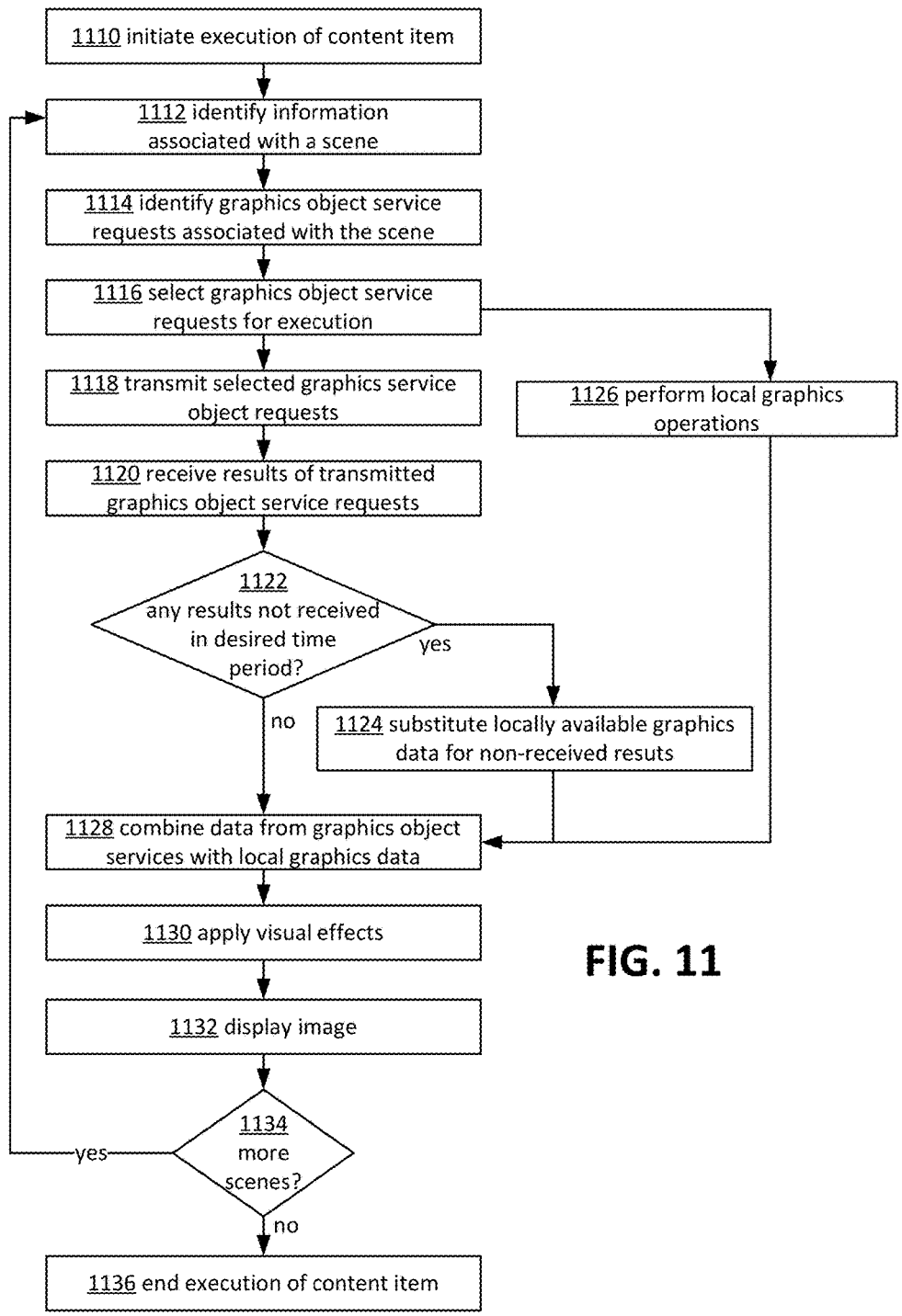
FIG. 11 is a flowchart depicting an example procedure for interacting with graphics object services in accordance with the present disclosure.

Thus, as described above, one or more graphics object services may be employed to provide data associated with various objects for compilation into an image. FIG. 11 is a flowchart depicting an example procedure for interacting with graphics object services in accordance with the present disclosure. At operation 1110, an execution of a content item such as a video game is initiated at a device such as client device 600 of FIG. 6. At operation 1112, information associated with a scene is identified. As set forth above, the information associated with the scene may be identified based on, for example, content information 611 of FIG. 6. As set forth above, the scene may be a two-dimensional or three-dimensional representation that may be used to generate a resulting two-dimensional image for display. It is noted that, in some cases, information associated with only one or more portions of a scene may be identified. The disclosed techniques are also applicable to scenarios in which information associated with only one or more portions of a scene is identified. Also, the disclosed techniques are applicable to scenarios in which an image for display is generated based on only one or more portions of a scene. For purposes of simplification, identifying a scene and/or generating an image based on a scene, as described herein, are intended to also include identifying one or more portions of a scene and/or generating an image based on one or more portions of a scene.

At operation 1114, any graphics object service requests associated with the scene are identified. Some scenes may have no associated graphics object service requests, while other scenes may have one or more associated graphics object service requests for data associated with one or more objects in the scenes. The graphics object service requests may be identified based on, for example, content information 611 of FIG. 6. As set forth above, a graphics object service request may, for example, include instructions that are formatted based on information associated with an API exposed by a graphics object service. A graphics object service request may also include, for example, instructions to render an object or to provide graphics commands in association with rendering of an object. A graphics object service request may also include, for example, a description of an object, a description of aspects of a two-dimensional or three-dimensional a scene, information for identifying and establishing communications with a graphics object service, account information, information regarding payment for the graphics object service request and any other appropriate information.

At operation 1116, none, some or all of the graphics object service requests identified at operation 1114 are selected for execution. The selection of graphics object service requests for execution may be performed, for example, by graphics object service request processing component 612 of FIG. 6. Graphics object service requests may be selected for execution based on any number of different factors. As set forth above, such factors may include, for example, user input regarding parameters such as certain preferred graphics object service requests, certain preferred graphics object services, authorization information for graphics object services, a desired graphics quality and other parameters. Graphics object service requests may also be selected for execution based on, for example, information regarding network quality of service conditions.

At operation 1118, each selected graphics object service request is transmitted to its associated graphics object service for execution. As set forth above, in some cases, information may also be provided to one or more graphics object services to coordinate the size and/or quality of request result data in order to prevent network communications to client 600 from overloading client 600 with too much data in a particular time period when the request results are returned.

At operation 1120, results of the graphics objects request are received by client 600. As set forth above, in some cases, it may be necessary to decompress and/or decode some or all of the received results.

As set forth above, in some cases, if any results are not received within a desired time period, then local data may be substituted for the non-received results. At operation 1122, it may be determined whether results for any of the graphics object service requests transmitted at operation 1118 have not been received within such a desired time period. If it is determined that any of the results have not been received within the desired time period, then, at act 1124 locally available data may be substituted for the non-received graphics object service request results. As set forth above, for example, a rendered version of an object from a previous image may be substituted for an object associated with the request. As another example, the object may be rendered locally by client 600 as a substitute for the non-received graphics object service request data.

At operation 1126, local graphics operations associated with the scene may be performed by client 600. The local graphics operations may include, for example, rendering or initiating a rendering process for portions of the scene that are not being rendered by graphics object services. FIG. 11 depicts operation 1126 as being performed in parallel with operations 1118-1124. In some cases, greater efficiency may be achieved by processing data for various portions of an image in parallel at both client 600 and one or more graphics object services 650. It is not, however, specifically required that any or all of operations 1126 and 1118-1124 be performed simultaneously with one another.

At operation 1128, data received from graphics object services is combined with local graphics data to compile a resulting image. In some cases, data may be combined such that rendered objects received from graphics object service requests may be at least partially included in the resulting image. Additionally, in some cases, data may be combined such that at least some commands received from graphics object service requests may be used to, at least in part, render one or more objects that are at least partially included in the resulting image. Various techniques may be employed to combine graphics data from the client device and the different graphics object services. As set forth above, one example combination technique may employ an image representation having multiple layers. Each layer of the representation may correspond to a respective portion of the image. For example, a first layer may include a first portion of the image rendered by a first graphics object service, while a second layer may include a second portion of the image rendered by a second graphics object service. Another example object combination technique may involve inserting rendered objects into identified areas within the image. For example, a first object rendered by a first graphics object service may be inserted at a first identified image area, while a second object rendered by a second graphics object service may be inserted at a second identified image area.

At operation 1130, one or more visual effects may, if desired, be applied to the resulting compiled image. As set forth above, there may be some cases in which combined portions of an image do not appear to blend into one another as smoothly or seamlessly as desired. In these and other cases, a variety of visual effects may be employed to help improve the appearance of combined portions of an image. In some cases, blurring effects and image filtering effects may be applied to image areas such as borders or transition points between objects or combined portions of an image. At operation 1132, the resulting image is displayed.

At operation 1134, it is determined whether there are any remaining scenes for display associated with execution of the content item. If so, the process returns to operation 1112 to identify data associated with a next remaining scene. If not, then, at operation 1136, execution of the content item is completed.

Figure 12:
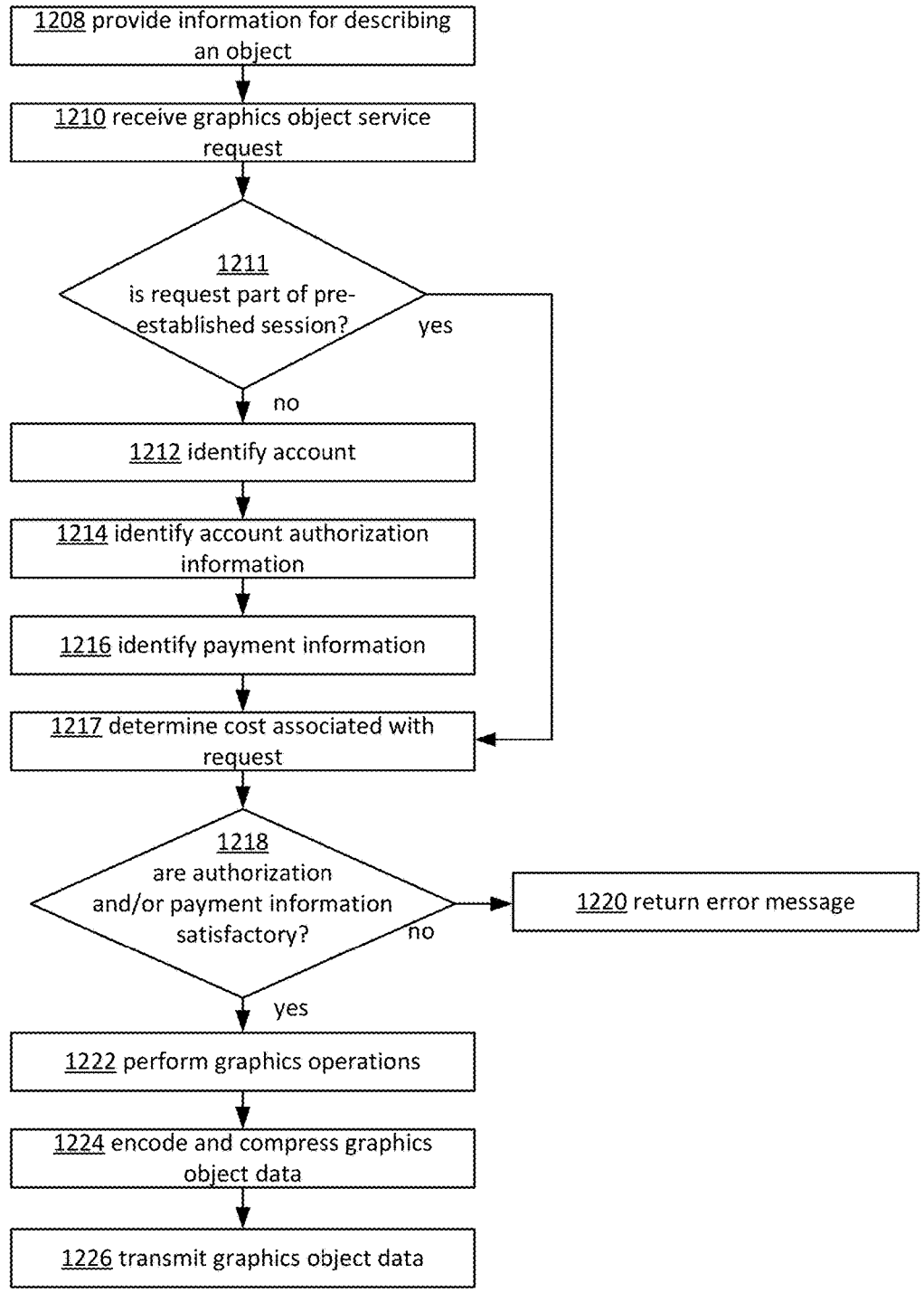
FIG. 12 is a flowchart depicting an example procedure for providing graphics object data in accordance with the present disclosure.

Thus, as set forth above, a client may interact with one or more graphics object services to obtain graphics object data. FIG. 12 is a flowchart depicting an example procedure for providing graphics object data in accordance with the present disclosure. At operation 1208, information is provided for describing an object. As set forth above, the provided information may identify one or more description formats that are understandable by a graphics object service. The provided information may, for example, correspond to an API associated with a graphics object service. The provided information may, in some cases, be used to describe the object in association with a two-dimensional or three dimensional scene, which may be generated by a content item such as a video game. The provided information may include, for example, any number of different calls and parameters and other information such as the examples depicted in FIGS. 3-5 and described in detail above.

At operation 1210, a graphics object service request is received by a graphics object service. Some example contents of a graphics object service request are described in detail above and are not repeated here.

At operation 1211, it is determined whether the request is part of a pre-established session with a particular requesting client. In some cases, when a particular client issues a graphics object service request, the graphics object service may establish a communications session with the particular client such that the particular client may issue subsequent requests as part of the same session (provided that the session is not terminated prior to receiving the subsequent requests). The establishment of such a session may provide a number of advantages. For example, in some cases, establishment of the session may allow account information, authorization information and/or payment information to be identified and associated with the pre-established session. This may result in higher efficiency by, for example, allowing the graphics object service to process subsequent requests within the session without having to repeatedly identify the account information, authorization information and/or payment information for each subsequent request (see operations 1212, 1214 and 1216 of FIG. 12). This may, in some cases, result in operations 1212, 1214 and 1216 being performed for a first request in a session and then omitted for subsequent requests in the session (as shown in FIG. 12).

At operation 1212, an account associated with the graphics object service request is identified. As set forth above, the account may, for example, correspond to a particular user or group of users, a particular client device from which the request was sent, a particular content item or any combination of these or other entities. The received graphics object service request may include information identifying the account. This account identification may include, for example, a user name, an account number, a credit card number, hardware and/or software identifiers, an IP address or any combination of this or other information.

At operation 1214, account authorization information is identified. In some cases, a graphics object service request may include authorization information such as a password, hardware and/or software identifiers, an IP address or any combination of this or other information. In other cases, use of an account may be presumed to be authorized and no authorization information may be provided.

At operation 1216, payment information is identified. As described above, in some cases, a subscription may be associated with an account. The subscription may, for example, charge the account a single flat fee in exchange for an unlimited number of graphics object service requests for a particular time period. In some other cases, an account may be billed individually for each request. As set forth above, in some cases, a graphics object service request may include payment information such as credit card information. Additionally, in some cases, previously received payment information may be stored in association with a particular account. Furthermore, in some cases, an account may have an associated balance or credit.

At operation 1217 a cost associated with the request is determined. As set forth above, any number of different approaches may be employed to determine costs for graphics service requests. In some cases, there may be a single flat fee for each individual request. In other cases, the cost per request may vary depending on factors such as a number of requests over a particular time period, the complexity of the request, the size of the object associated with the request, the type of the object associated with the request, the content item for which the request is issued, the account issuing the request and any combination of these or other factors. In some cases, it may not be necessary to determine cost such as when a subscription has been paid for unlimited operations within a particular time period.

At operation 1218, it is determined whether the identified authorization information and/or the identified payment information for the account are satisfactory. This determination may include, for example, determining whether sufficient information has been received to enable payment and authorization. This determination may also include, for example, validating the identified information against stored information and requirements. For example, authorization information may be validated by comparing authorization information in the received graphics object service request against stored authorization information associated with the identified account.

In some cases, received payment information may be validated by, for example, confirming that received credit card information satisfies valid date and number formats and is not expired. Previously received payment information may also sometimes be revalidated. Payment information may also be validated by, for example, confirming that a subscription is still valid or confirming that a balance or credit associated with an account exceeds the cost determined at operation 1217.

If either or both of the account authorization information or the payment information are unsatisfactory, then, at operation 1220, an error message may be transmitted back to the requesting client to indicate a problem with the request and possibly request additional information or payment. If the account authorization information and the payment information are satisfactory, then, at operation 1222, one or more graphics operations may be performed in accordance with the received graphics object service request. It is noted that, in some cases, it may not be necessary or desired to determine that both payment and authorization information or satisfactory. In some cases, a determination of satisfaction with only payment information or only authorization information or neither type of information may be performed. Additionally, there is no requirement that the determinations with respect to payment and authorization be made simultaneously or in combination with one another.

The graphics operations performed at operation 1222 may be performed by components such as graphics processing components 652 of FIG. 6, which may include, for example, one or more graphics processing units. As set forth above, the performed graphics operations may include, for example, rendering an object or generating graphics commands associated with rendering of an object. Rendering of an object may encompass operations such as, for example, projection, reflection, lighting, shading and others. The graphics operations may, for example, be performed based on a description of the object in association with a two-dimensional or three-dimensional scene that may be provided in the graphics object service request and/or a pointer or identifier within the graphics object service request. The graphics operations may, in some cases, also be performed based on stored graphics information associated with various object types such as stored graphics information 662 of FIG. 6. This stored graphics information may, for example, be retrieved and supplemented with the descriptions of the object and the scene and/or other example information that may, in some cases, be included in, pointed to or otherwise identified by the received graphics object request.

After performance of the graphics operations at operation 1222, the resulting graphics object data may be encoded and compressed for transmission back to the requesting client device at operation 1224. In some cases, it may not be necessary to encode and/or compress the requested graphics data. Additionally, in some cases, encoding and/or compression may be performed in accordance with information provided by the requesting client or other components to help ensure that the requesting client is not overburdened with receiving too much data resulting from graphics object service requests within a particular time period. After any necessary encoding and/or compressing operations are performed, the requested graphics object data may be transmitted back to the requesting client 600 at operation 1226.

In addition or as an alternative to the embodiments described above, there are some cases in which a graphics object service request may be delivered to a different device or node then the device or node that issued the request. For example, in some cases, a server computer may execute a content item and transmit images or portions of images to a client device for display at the client device. The server may also submit various graphics object requests to one or more graphics object services, the results of which are also delivered to the client device. The client device may be provided with instructions for combining different portion of each image using, for example, any of the combination techniques described above. As another example, in some cases, graphics commands generated by a graphics object service may be executed by a third party or other device or node to render an object before being provided to the client device. As yet another example, results of graphics object requests may be combined by a third party or other device or node using, for example, any of the combination techniques described above before being provided to a client device.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
   calculating, by a client device, an amount of incoming data that is receivable by the client device within a time period;
   allocating, by the client device, a first portion of the amount of incoming data to a first request for a first service external to the client device to render a first object associated with a scene of a video game;
   determining, by the client device, a first encoding bitrate for the first object based at least in part on the first portion of the amount of incoming data;
   transmitting, to the first service, the first request to render the first object and an indication of the first encoding bitrate;
   allocating, by the client device, a second portion of the amount of incoming data to a second request for a second service external to the client device to render a second object also associated with the scene of the video game;
   determining, by the client device, a second encoding bitrate for the second object based at least in part on the second portion of the amount of incoming data;
   transmitting, to the second service, the second request to render the second object and an indication of the second encoding bitrate;
   receiving, by the client device, the first object from the first service and the second object from the second service; and displaying, on the client device, an image associated with the scene, the image including the first object and the second object.

2. The method of claim 1, further comprising combining, by the client device, a first portion of the image with a second portion of the image, wherein the first portion includes the first object and the second portion includes the second object.

3. The method of claim 2, wherein combining the first portion of the image with the second portion of the image is performed in accordance with a representation that includes multiple layers, wherein a first layer corresponds to the first portion of the image, and wherein a second layer corresponds to the second portion of the image.

4. The method of claim 2, wherein combining the first portion of the image with the second portion of the image comprises inserting the first portion into a first identified area of the image and inserting the second portion into a second identified area of the image.

5. The method of claim 2, wherein a third portion of the image is rendered by the client device.

6. The method of claim 2, further comprising:
generating a blurring effect at an area along a border of the first portion of the image and the second portion of the image.

7. The method of claim 2, wherein the video game comprises instructions for requesting rendering of the first object.

8. A system comprising:
one or more processors
one or more memories to store a set of instructions, which if executed by the one or more processors, causes the one or more processors to perform operations comprising:
calculating, by a client device, an amount of incoming data that is receivable by the client device within a time period;
allocating, by the client device, a first portion of the amount of incoming data to a first request for a first service external to the client device to render a first object associated with a scene of a video game;
determining, by the client device, a first encoding bitrate for the first object based at least in part on the first portion of the amount of incoming data;
transmitting, to the first service, the first request to render the first object and an indication of the first encoding bitrate;
allocating, by the client device, a second portion of the amount of incoming data to a second request for a second service external to the client device to render a second object also associated with the scene of the video game;
determining, by the client device, a second encoding bitrate for the second object based at least in part on the second portion of the amount of incoming data;
transmitting, to the second service, the second request to render the second object and an indication of the second encoding bitrate;
receiving, by the client device, the first object from the first service and the second object from the second service; and
displaying, on the client device, an image associated with the scene, the image including the first object and the second object.

9. The system of claim 8, further comprising combining, by the client device, a first portion of the image with a second portion of the image, wherein the first portion includes the first object and the second portion includes the second object.

10. The system of claim 9, wherein combining the first portion of the image with the second portion of the image is performed in accordance with a representation that includes multiple layers, wherein a first layer corresponds to the first portion of the image, and wherein a second layer corresponds to the second portion of the image.

11. The system of claim 9, wherein combining the first portion of the image with the second portion of the image comprises inserting the first portion into a first identified area of the image and inserting the second portion into a second identified area of the image.

12. The system of claim 9, wherein a third portion of the image is rendered by the client device.

13. The system of claim 9, wherein the operations further comprise:
generating a blurring effect at an area along a border of the first portion of the image and the second portion of the image.

14. The system of claim 9, wherein the video game comprises instructions for requesting rendering of the first object.

15. A non-transitory computer-readable medium having stored thereon a set of instructions, which if performed by one or more processors, causes the one or more processors to perform operations comprising:
calculating, by a client device, an amount of incoming data that is receivable by the client device within a time period;
allocating, by the client device, a first portion of the amount of incoming data to a first request for a first service external to the client device to render a first object associated with a scene of a video game;
determining, by the client device, a first encoding bitrate for the first object based at least in part on the first portion of the amount of incoming data;
transmitting, to the first service, the first request to render the first object and an indication of the first encoding bitrate;
allocating, by the client device, a second portion of the amount of incoming data to a second request for a second service external to the client device to render a second object also associated with the scene of the video game;
determining, by the client device, a second encoding bitrate for the second object based at least in part on the second portion of the amount of incoming data;
transmitting, to the second service, the second request to render the second object and an indication of the second encoding bitrate;
receiving, by the client device, the first object from the first service and the second object from the second service; and
displaying, on the client device, an image associated with the scene, the image including the first object and the second object.

16. The non-transitory computer-readable medium of claim 15, further comprising combining, by the client device, a first portion of the image with a second portion of the image, wherein the first portion includes the first object and the second portion includes the second object.

17. The non-transitory computer-readable medium of claim 16, wherein combining the first portion of the image with the second portion of the image is performed in accordance with a representation that includes multiple layers, wherein a first layer corresponds to the first portion of the image, and wherein a second layer corresponds to the second portion of the image.

18. The non-transitory computer-readable medium of claim 16, wherein combining the first portion of the image with the second portion of the image comprises inserting the first portion into a first identified area of the image and inserting the second portion into a second identified area of the image.

19. The non-transitory computer-readable medium of claim 16, wherein a third portion of the image is rendered by the client device.

20. The non-transitory computer-readable medium of claim 16, wherein the video game comprises instructions for requesting rendering of the first object.

\* \* \* \* \*